United States Patent
Yu et al.

(10) Patent No.: US 12,267,158 B2
(45) Date of Patent: *Apr. 1, 2025

(54) SERVICE PACKET TRANSMISSION METHOD AND APPARATUS

(71) Applicant: Huawei Technologies Co., Ltd., Shenzhen (CN)

(72) Inventors: Fang Yu, Shenzhen (CN); Yan Li, Beijing (CN); Hui Ni, Beijing (CN); Yongcui Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 154 days.

This patent is subject to a terminal disclaimer.

(21) Appl. No.: 18/309,046

(22) Filed: Apr. 28, 2023

(65) Prior Publication Data

US 2023/0336269 A1     Oct. 19, 2023

Related U.S. Application Data

(63) Continuation of application No. 17/561,190, filed on Dec. 23, 2021, now Pat. No. 11,677,492, which is a
(Continued)

(30) Foreign Application Priority Data

Jun. 24, 2019 (CN) .......................... 201910551336.X

(51) Int. Cl.
*H04L 1/00* (2006.01)
(52) U.S. Cl.
CPC .......... *H04L 1/0006* (2013.01); *H04L 1/0015* (2013.01)
(58) Field of Classification Search
None
See application file for complete search history.

(56) References Cited

U.S. PATENT DOCUMENTS

| | | |
|---|---|---|
| 11,089,520 B2 | 8/2021 | Zhu et al. |
| 11,677,492 B2 * | 6/2023 | Yu .......................... H04L 1/0015 370/328 |

(Continued)

FOREIGN PATENT DOCUMENTS

| | | |
|---|---|---|
| CN | 101651971 A | 2/2010 |
| CN | 109673008 A | 4/2019 |

(Continued)

OTHER PUBLICATIONS

"3rd Generation Partnership Project; Technical Specification Group Services and System Aspects; System Architecture for the 5G System; Stage 2 (Release 16)," 3GPP TS 23.501 V16.1.0, Jun. 2019, 368 pages.

(Continued)

*Primary Examiner* — Anh Vu H Ly
(74) *Attorney, Agent, or Firm* — SLATER MATSIL, LLP

(57) ABSTRACT

A service packet transmission method and apparatus, the method including receiving, by the source mobile edge computing network element, after a source mobile edge computing network element receives a second uplink service packet, a first uplink service packet sent by a source user plane network element and that is from a target user plane network element, where the second uplink service packet is the last uplink service packet sent by the source mobile edge computing network element to a source application server, sending, by the source mobile edge computing network element, the first uplink service packet to a target mobile edge computing network element, and sending, by the source mobile edge computing network element, first indication information to the target mobile edge computing network element, the first indication information indicating that the sending of the first uplink service packet by the source mobile edge computing network element ends.

20 Claims, 19 Drawing Sheets

Related U.S. Application Data continuation of application No. PCT/CN2020/097385, filed on Jun. 22, 2020.

(56) References Cited

U.S. PATENT DOCUMENTS

| | | | |
|---|---|---|---|
| 2018/0317157 A1 | 11/2018 | Baek et al. | |
| 2019/0124496 A1 | 4/2019 | Ye et al. | |
| 2019/0261260 A1* | 8/2019 | Dao | H04W 48/00 |
| 2019/0387062 A1* | 12/2019 | Enat | H04L 67/10 |
| 2020/0120446 A1 | 4/2020 | Stammers et al. | |
| 2020/0178198 A1 | 6/2020 | Ding et al. | |
| 2020/0196203 A1 | 6/2020 | Yang et al. | |
| 2020/0229038 A1* | 7/2020 | Zhu | H04W 28/10 |
| 2020/0274942 A1 | 8/2020 | Mueck et al. | |
| 2020/0275313 A1 | 8/2020 | He et al. | |
| 2020/0296575 A1 | 9/2020 | Lu et al. | |
| 2020/0374974 A1 | 11/2020 | Sun et al. | |
| 2021/0076250 A1 | 3/2021 | Wang et al. | |
| 2021/0314266 A1* | 10/2021 | Li | H04L 47/2441 |
| 2022/0167262 A1 | 5/2022 | Ding et al. | |

FOREIGN PATENT DOCUMENTS

| | | |
|---|---|---|
| CN | 109691179 A | 4/2019 |
| CN | 109788513 A | 5/2019 |
| CN | 109842558 A | 6/2019 |
| CN | 109842639 A | 6/2019 |
| WO | 2018113401 A1 | 6/2018 |
| WO | 2018206844 A1 | 11/2018 |
| WO | 2019001854 A1 | 1/2019 |

OTHER PUBLICATIONS

Qiang, H. et al., "MEC in 5G Evolution," Nov. 2018, 6 pages (English Abstract).

"23.501: Editorial Corrections and EN Removal," Source: Nokia, Nokia Shanghai Bell (Rapporteur), Document for: Approval, Agenda Item: 6.5.1, Work Item/Release: 5GS_ph1/Rel-15, SA WG2 Meeting # SA WG2 Meeting #124, 82-179619, Nov. 27-Dec. 1, 2017, 159 pages.

"Discussion on SA2 Edge Computing Study," Huawei, Intel, 3GPP TSG-SA WG2 Meeting #131, S2-1901832, Feb. 19, 2019, 13 pages.

"New SID: Study on enhancement of support for Edge Computing in 5GC," Source: SA WG2, Document for: Approval, Agenda Item: 19, TSG SA Meeting #SP-83, SP-190185, Mar. 20-22, 2019, Shenzhen, China, 4 pages.

* cited by examiner

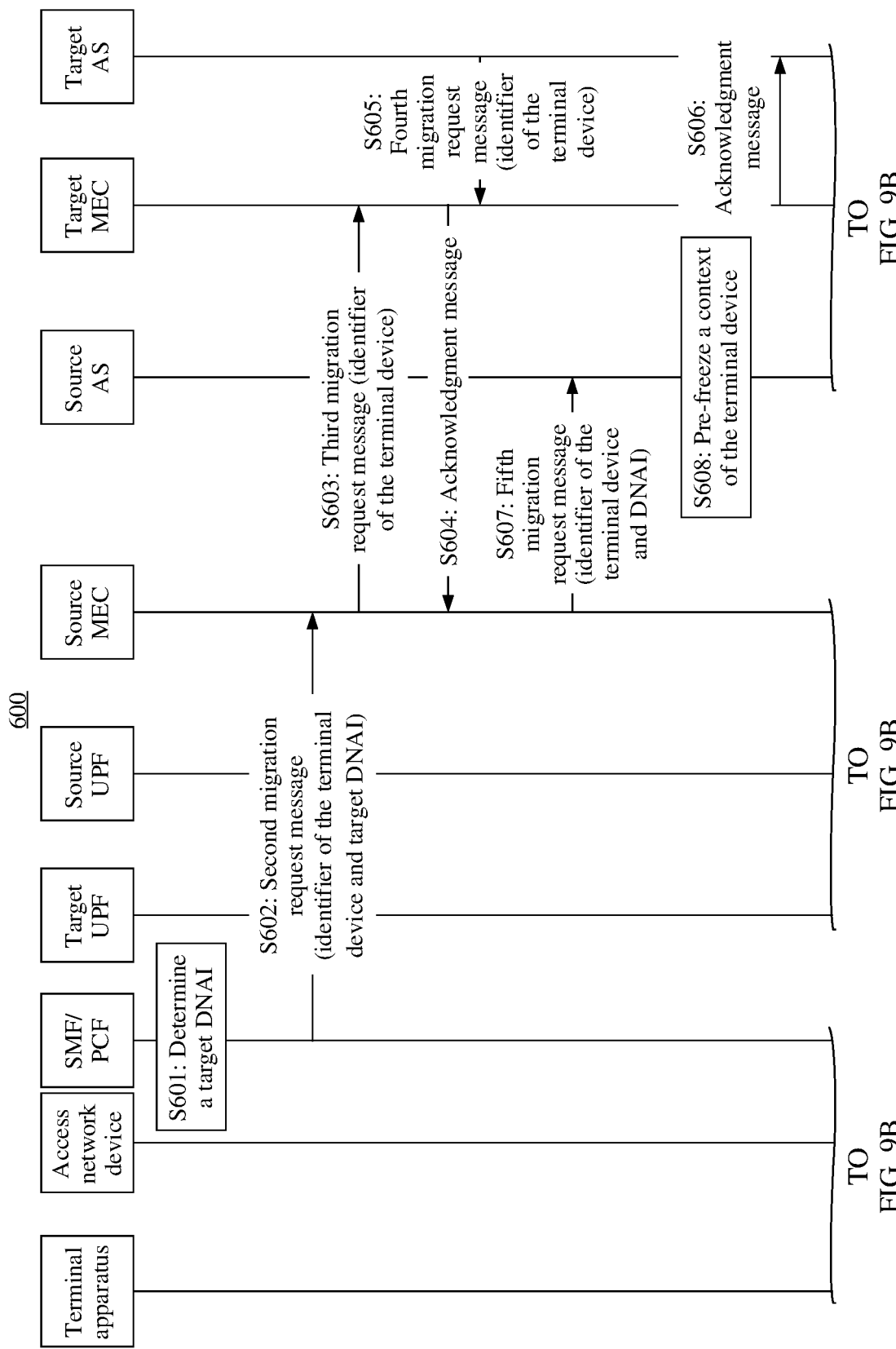

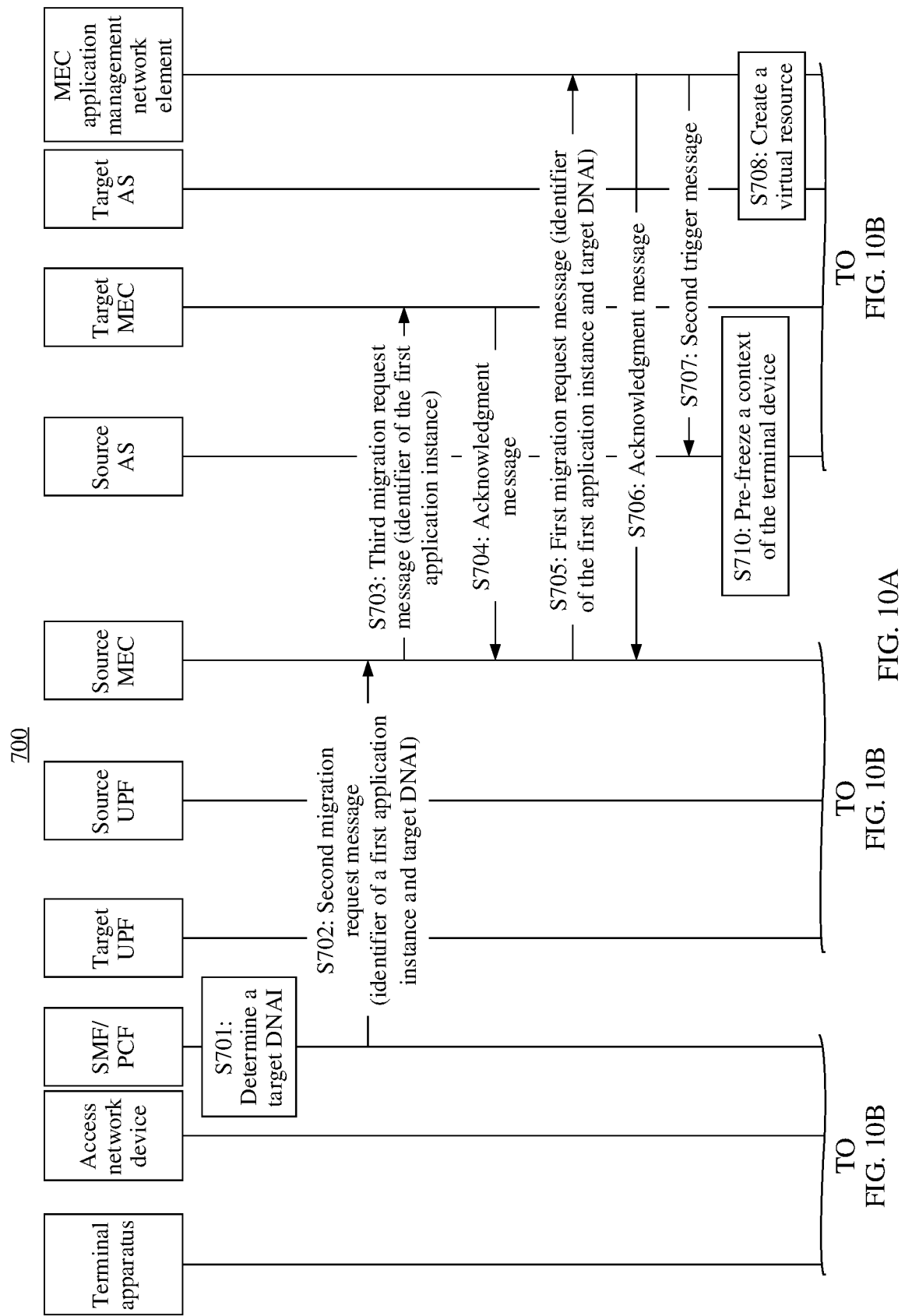

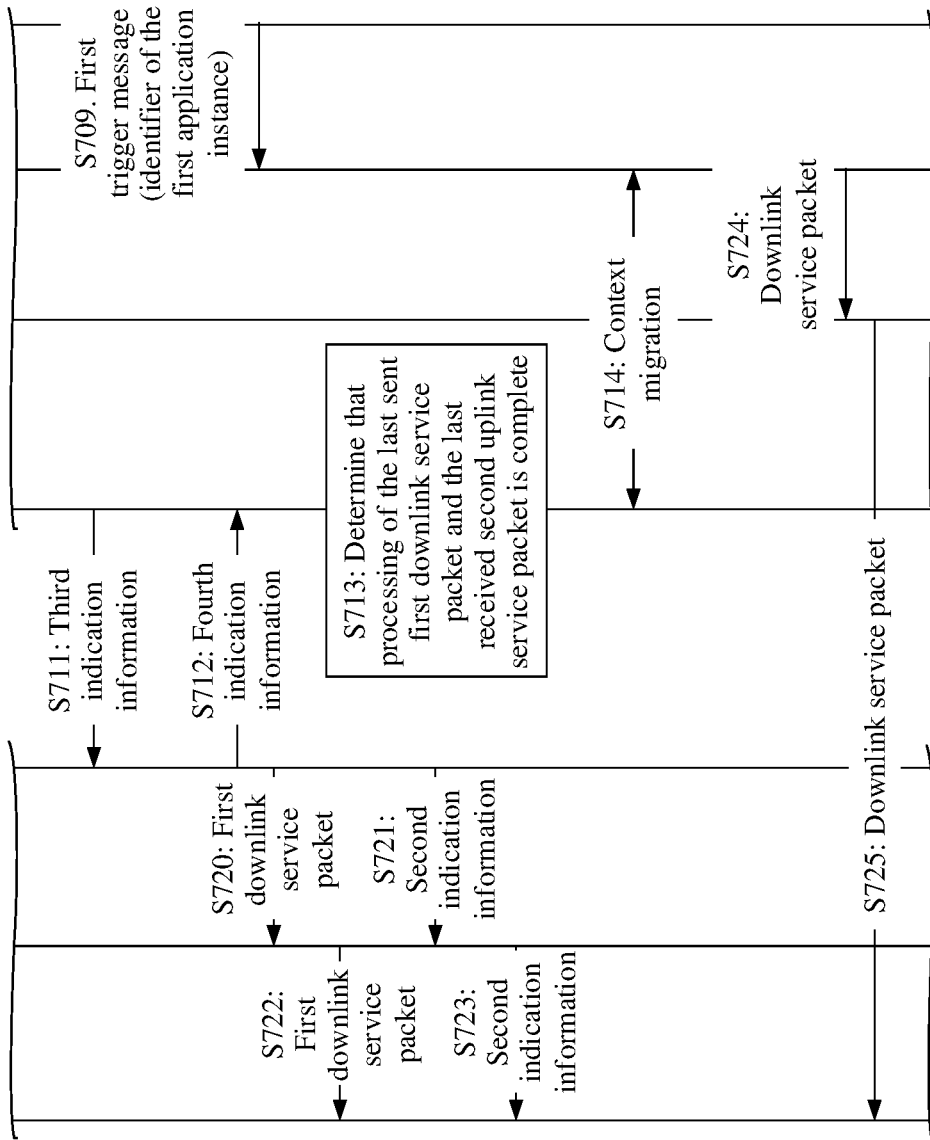

SERVICE PACKET TRANSMISSION METHOD AND APPARATUS

CROSS-REFERENCE TO RELATED APPLICATIONS

This application is a continuation of U.S. patent application Ser. No. 17/561,190, filed on Dec. 23, 2021, which is a continuation of International Application No. PCT/CN2020/097385, filed on Jun. 22, 2020. The International Application claims priority to Chinese Patent Application No. 201910551336.X, filed on Jun. 24, 2019. All of the aforementioned patent applications are hereby incorporated by reference in their entireties.

TECHNICAL FIELD

This application relates to the communication field, and more specifically, to a service packet transmission method and apparatus in the communication field.

BACKGROUND

When a terminal apparatus moves from coverage of an original access network device to coverage of a current access network device, air interface handover is triggered, that is, the terminal apparatus is handed over from the original access network device to the current access network device. Although a location of the terminal apparatus changes, the terminal apparatus still accesses an original user plane network element. However, in practice, a user plane network element closest to the terminal apparatus may have changed, but the terminal apparatus still performs packet transmission with the original user plane network element. In this case, a transmission path is relatively long, and accordingly, a packet transmission latency increases. To reduce the packet transmission latency, the transmission path needs to be switched from the original user plane network element to a new user plane network element. In a switching process, uplink and downlink service packets that have not been transmitted are prone to be lost, and transmission performance deteriorates.

SUMMARY

This application provides a service packet transmission method and apparatus, to improve transmission performance.

According to a first aspect, a service packet transmission method is provided. The method includes after a source mobile edge computing network element receives a second uplink service packet, the source mobile edge computing network element receives a first uplink service packet that is sent by a source user plane network element and that is from a target user plane network element, where the second uplink service packet is the last uplink service packet sent by the source mobile edge computing network element to a source application server, the source mobile edge computing network element sends the first uplink service packet to a target mobile edge computing network element, and the source mobile edge computing network element sends first indication information to the target mobile edge computing network element, where the first indication information is used to indicate that the sending of the first uplink service packet by the source mobile edge computing network element ends.

Therefore, in this embodiment of this application, after sending the last second uplink service packet to the source application server, the source mobile edge computing network element sends the first uplink service packet after the second uplink service packet to a target application server by using the target mobile edge computing network element. In this way, loss of the first uplink service packet can be avoided, thereby helping improve transmission performance. In addition, the source mobile edge computing network element may send the first indication information to the target mobile edge computing network element, to indicate that the sending of the first uplink service packet by the source mobile edge computing network element ends. In this way, the target mobile edge computing network element can be prevented from keeping waiting to receive an uplink service packet sent by the source mobile edge computing network element, to help the target mobile edge computing network element to send an uplink service packet.

In some possible implementations, before the source mobile edge computing network element sends the first uplink service packet to the target mobile edge computing network element, the method further includes the source mobile edge computing network element receives second indication information that is sent by the source user plane function user plane network element and that is from the target user plane network element, where the second indication information is used to indicate that sending of the first uplink service packet by the target user plane network element ends.

Optionally, after receiving the first uplink service packet sent by the source user plane network element, the source mobile edge computing network element receives the second indication information sent by the source user plane network element, or the source mobile edge computing network element may simultaneously receive the second indication information and the first uplink service packet that are sent by the source user plane network element.

It should be noted that the first indication information and the second indication information may be signaling between different network elements, but the first indication information and the second indication information may include a same information element, to be specific, the same information element may be an identifier indicating that the sending of the uplink service packet ends. In other words, after the target user plane network element sends the second indication information to the source user plane network element, and after the source user plane network element forwards the second indication information to the source mobile edge computing network element, the source mobile edge computing network element may determine that the sending of the uplink service packet that is from the target user plane network element ends. That is, the source user plane network element no longer sends, to the source mobile edge computing network element, an uplink service packet that is from the target user plane network element. After the source mobile edge computing network element sends the first indication information to the target mobile edge computing network element, the target mobile edge computing network element may determine that the sending of the uplink service packet that is from the source mobile edge computing network element ends. That is, the source mobile edge computing network element no longer sends an uplink service packet to the target mobile edge computing network element.

In some possible implementations, before the source mobile edge computing network element sends the first uplink service packet to the target mobile edge computing network element, the method further includes the source mobile edge computing network element sends a first downlink service packet and third indication information to the source user plane network element, where the third indication information is used to indicate that sending of a downlink service packet that is from the source application server ends.

In some possible implementations, before the source mobile edge computing network element sends the first downlink service packet to the source user plane network element, the method further includes the following.

The source mobile edge computing network element receives fourth indication information sent by a first network element, where the fourth indication information is used to indicate that the last downlink service packet from the source application server is the first downlink service packet, and the source mobile edge computing network element sends fifth indication information to the first network element, where the fifth indication information is used to indicate that the second uplink service packet is the last uplink service packet sent by the source mobile edge computing network element to the source application server.

In some possible implementations, the fourth indication information is a sequence number of the first downlink service packet, and the fifth indication information is a sequence number of the second uplink service packet.

In some possible implementations, that the source mobile edge computing network element sends third indication information to the source user plane network element includes the source mobile edge computing network element sends the third indication information to the source user plane network element based on the fourth indication information.

In some possible implementations, before the source mobile edge computing network element sends the first uplink service packet to the target mobile edge computing network element, the method further includes the source mobile edge computing network element receives a second relocation request message sent by a policy control network element or a session management network element, where the second relocation request message is used to notify that a target data network access point identifier changes or is used to notify that the user plane network element changes, and the second relocation request message includes an identifier of a terminal apparatus and the target data network access point identifier.

In some possible implementations, after receiving the second relocation request message, the source mobile edge computing sends a fifth relocation request message to the source application server, where the fifth relocation request message is used to request the application server to relocate a context of the terminal apparatus, and the fifth relocation request message includes the identifier of the terminal apparatus and the target data network access point identifier.

In some possible implementations, after the source mobile edge computing network element receives the second relocation request message sent by the policy control network element or the session management network element, the method further includes the following.

The source mobile edge computing network element sends a third relocation request message to the target mobile edge computing network element, where the third relocation request message is used to request the target mobile edge computing network element to relocate a context of the terminal apparatus, and the third relocation request message includes the identifier of the terminal apparatus, and the source mobile edge computing network element receives an acknowledgment message that is of the third relocation request message and that is sent by the target mobile edge computing network element.

In some possible implementations, after receiving the second relocation request message, the source mobile edge computing sends a fifth relocation request message to the source application server, where the fifth relocation request message is used to request the source application server to relocate a context of the terminal apparatus, and the fifth relocation request message includes the identifier of the terminal apparatus and the target data network access point identifier.

In some possible implementations, after the source mobile edge computing network element sends the fifth relocation request message to the source application server, the method further includes the source mobile edge computing network element receives a context relocation complete message from the source application server, where the context relocation complete message is used to indicate that the source application server and a target application server corresponding to the target data network access point identifier have completed the relocation of the context of the terminal apparatus.

In some possible implementations, before the source mobile edge computing network element sends the first uplink service packet to the target mobile edge computing network element, the method further includes the source mobile edge computing network element receives a second relocation request message sent by a policy control function (PCF) network element or an session management function (SMF) network element, where the second relocation request message is used to notify that a target data network access point identifier changes or is used to notify that the user plane network element changes, and the second relocation request message includes an identifier of a first application instance and the target data network access point identifier.

In some possible implementations, after receiving the second relocation request message, the source mobile edge computing sends a first relocation request message to a mobile edge computing application management network element, where the first relocation request message is used to request the mobile edge computing application management network element to relocate a context of a terminal apparatus, and the first relocation request message includes the identifier of the first application instance and the target data network access point identifier. The mobile edge computing application management network element sends an acknowledgment message of the first relocation request message to the source mobile edge computing, where the acknowledgment message is used to indicate that the mobile edge computing application management network element can accept the relocation of the context of the first application instance.

In some possible implementations, after the source mobile edge computing network element receives the second relocation request message sent by the PCF network element or the SMF network element, the method further includes the source mobile edge computing network element sends a third relocation request message to the target mobile edge computing network element, where the third relocation request message is used to request whether the target mobile edge computing accepts the relocation of the context of the first application instance, and the third context relocation request message includes the identifier of the first application instance. If the target mobile edge computing can accept the relocation of the context of the terminal apparatus, the target mobile edge computing sends an acknowledgment message of the third relocation request message to the source mobile edge computing, where the acknowledgment message of the third relocation request is used to indicate that the target mobile edge computing can accept the relocation of the context of the first application instance.

In some possible implementations, after the source mobile edge computing network element sends the first relocation request message to the mobile edge computing application management network element, the method further includes the following.

The source mobile edge computing network element receives a context relocation complete message from the mobile edge computing application management network element, where the context relocation complete message is used to indicate that the source application server and a target application server corresponding to the target data network access point identifier have completed the relocation of the context of the terminal apparatus.

According to a second aspect, a service packet transmission method is provided. The method includes a target user plane network element sends a first uplink service packet to a source user plane network element, where the target user plane no longer sends an uplink service packet to the source user plane after sending the first uplink service packet to the source user plane, and the target user plane sends second indication information to the source user plane, where the second indication information is used to indicate that the sending of the first uplink service packet by the target user plane network element ends.

Therefore, in this embodiment of this application, after sending the first uplink service packet to the source user plane, the target user plane no longer sends the uplink service packet to the source user plane, and the target user plane may send the second indication information to the source user plane, to indicate that the sending of the first uplink service packet by the target user plane ends. Then, the target user plane may directly send, to a target mobile edge computing network element, an uplink service packet that is from an access network device, without needing to send the uplink service packet to the source user plane network element. In this way, after determining that the sending of the first uplink service packet ends, the target mobile edge computing network element sends the uplink service packet that is directly from the target user plane, so that an out-of-order problem of uplink service packets can be avoided.

In some possible implementations, before the target user plane network element sends the first uplink service packet to the source user plane network element, the method further includes the target user plane network element receives a first downlink service packet and third indication information from the source user plane network element, where the third indication information is used to indicate that sending of a downlink service packet that is from a source application server ends.

In some possible implementations, that the target user plane network element sends second indication information to the source user plane network element includes the target user plane network element sends the second indication information to the source user plane network element based on the third indication information.

In some possible implementations, that the target user plane network element sends second indication information to the source user plane network element includes after the target user plane network element receives a context relocation complete message sent by a session management network element or the target mobile edge computing network element, the target user plane network element sends the second indication information to the source user plane network element.

In some possible implementations, after the target user plane network element sends the second indication information to the source user plane network element, the method further includes the target user plane network element sends, to the target mobile edge computing network element, the uplink service packet that is from the access network device.

In some possible implementations, after the target user plane network element receives the third indication information, the method further includes after the first downlink service packet is sent, the target user plane network element sends, to the access network device, a downlink service packet that is from the target mobile edge computing network element.

According to a third aspect, a service packet transmission method is provided. The method includes a target mobile edge computing network element receives a first uplink service packet from a source mobile edge computing network element, where the first uplink service packet is an uplink service packet received by the source mobile edge computing after the source mobile edge computing receives a second uplink service packet, and the second uplink service packet is the last uplink service packet sent by the source mobile edge computing network element to a source application server, the target mobile edge computing receives first indication information from the source mobile edge computing network element, where the first indication information is used to indicate that sending of the first uplink service packet by the source mobile edge computing network element ends, and after the target mobile edge computing network element receives the first indication information, the target mobile edge computing network element sends, to a target application server after the first uplink service packet is sent, an uplink service packet that is sent by a target user plane network element to the target mobile edge computing network element.

Therefore, in this embodiment of this application, after sending the last second uplink service packet to the source application server, the mobile edge computing network element sends the first uplink service packet after the second uplink service packet to the target application server by using the target mobile edge computing network element, so that loss of the first uplink service packet can be avoided, and the source mobile edge computing network element may send the first indication information to the target mobile edge computing network element, to indicate that the sending of the first uplink service packet by the source mobile edge computing network element ends. In this way, the target mobile edge computing network element can be prevented from keeping waiting to receive an uplink service packet sent by the source mobile edge computing network element. After receiving the first indication information, and after sending, to the target application server, the uplink service packet that is from the source mobile edge computing network element, the target mobile edge computing network element sends the uplink service packet that is from the target user plane network element, to avoid an out-of-order problem of uplink service packets.

In some possible implementations, before the target mobile edge computing network element receives the first uplink service packet from the source mobile edge computing network element, the method further includes the target mobile edge computing receives a third relocation request message from the source mobile edge computing, where the third relocation request message includes an identifier of a terminal apparatus, and the third relocation request message is used to request whether the target mobile edge computing accepts relocation of a context of the terminal apparatus. If the target mobile edge computing can accept the relocation of the context of the terminal apparatus, the target mobile edge computing sends an acknowledgment message of the third relocation request message to the source mobile edge computing, where the acknowledgment message of the third relocation request message is used to indicate that the target mobile edge computing can accept the relocation of the context of the terminal apparatus.

In some possible implementations, before the target mobile edge computing network element receives the first uplink service packet from the source mobile edge computing network element, the method further includes the target mobile edge computing receives a third relocation request message from the source mobile edge computing, where the third relocation request message includes an identifier of a first application instance, and the third relocation request message is used to request whether the target mobile edge computing accepts relocation of a context of the first application instance. If the target mobile edge computing can accept the relocation of the context of the terminal apparatus, the target mobile edge computing sends an acknowledgment message of the third relocation request message to the source mobile edge computing, where the acknowledgment message of the third relocation request is used to indicate that the target mobile edge computing can accept the relocation of the context of the first application instance.

According to a fourth aspect, a service packet transmission method is provided. The method includes a source application server receives a first message, where the first message is used to trigger the source application server to relocate a context of a terminal apparatus, and the first message includes a target data network access point identifier, and after the source application server determines that processing of a first downlink service packet and a second uplink service packet is complete, the source application server relocates the context of the terminal apparatus to a target application server corresponding to the target data network access point identifier, where the first downlink service packet is the last downlink service packet sent by the source application server to a source mobile edge computing network element, and the second uplink service packet is the last uplink service packet sent by the source mobile edge computing network element to the source application server.

In some possible implementations, the first message is the foregoing fifth relocation request message.

In some possible implementations, before the source application server relocates the context of the terminal apparatus to the target application server corresponding to the target data network access point identifier, the method further includes the source application server sends fourth indication information to the source mobile edge computing network element, where the fourth indication information is used to indicate that the first downlink service packet is the last downlink service packet from the source application server, and the source application server receives fifth indication information sent by the source mobile edge computing network element, where the fifth indication information is used to indicate that the second uplink service packet is the last uplink service packet sent by the source mobile edge computing network element to the source application server.

In some possible implementations, the fourth indication information is a sequence number of the first downlink service packet, and the fifth indication information is a sequence number of the second uplink service packet.

According to a fifth aspect, a service packet transmission method is provided. The method includes a mobile edge computing application management network element receives a first relocation request message sent by a source mobile edge computing network element, where the first relocation request message includes an identifier of a first application instance and a target data network access point identifier, the mobile edge computing application management network element determines, based on the identifier of the first application instance, the first application instance that is to be relocated, and the mobile edge computing application management network element separately sends a first trigger message and a second trigger message to a target application server corresponding to the target data network access point identifier and a source application server corresponding to the first application instance, where the first trigger message includes the identifier of the first application instance, the first trigger message is used to trigger the target application server to relocate the first application instance, and the second trigger message is used to trigger the source application server to relocate the first application instance.

In some possible implementations, before the mobile edge computing application management network element separately sends the first trigger message and the second trigger message to the target application server corresponding to the target data network access point identifier and the source application server corresponding to the target application instance, the method further includes the mobile edge computing application management network element creates a virtual resource of the first application instance on the target application server, to enable the target application server to relocate the first application instance based on the virtual resource.

According to a sixth aspect, this application provides a service packet transmission apparatus, configured to implement the method according to any one of the first aspect and/or the possible implementations of the first aspect. The apparatus may be a source mobile edge computing network element, an apparatus in the source mobile edge computing network element, or an apparatus that can be used together with a network device. In a design, the apparatus may include a module corresponding to performing the method/operation/step/action described in any one of the first aspect and/or the possible implementations of the first aspect. The module may be implemented by a hardware circuit, software, or a combination of a hardware circuit and software. In a design, the apparatus may include a receiving unit and a sending unit, and the receiving unit and the sending unit may be one transceiver unit or different transceiver units.

According to a seventh aspect, this application provides a service packet transmission apparatus, configured to implement the method according to any one of the second aspect and/or the possible implementations of the second aspect. The apparatus may be a target user plane network element, an apparatus in the target user plane network element, or an apparatus that can be used together with the target user plane network element. In a design, the apparatus may include a module corresponding to performing the method/operation/step/action described in any one of the second aspect and/or the possible implementations of the second aspect. The module may be implemented by a hardware circuit, software, or a combination of a hardware circuit and software. In a design, the apparatus may include a sending unit.

According to an eighth aspect, this application provides a service packet transmission apparatus, configured to implement the method according to any one of the third aspect and/or the possible implementations of the third aspect. The apparatus may be a target mobile edge computing network element, an apparatus in the target mobile edge computing network element, or an apparatus that can be used together with the target mobile edge computing network element. In a design, the apparatus may include a module corresponding to performing the method/operation/step/action described in any one of the third aspect and/or the possible implementations of the third aspect. The module may be implemented by a hardware circuit, software, or a combination of a hardware circuit and software. In a design, the apparatus may include a receiving unit and a sending unit, and the receiving unit and the sending unit may be one transceiver unit or different transceiver units.

According to a ninth aspect, this application provides a service packet transmission apparatus, configured to implement the method according to any one of the fourth aspect and/or the possible implementations of the fourth aspect. The apparatus may be a source application server, an apparatus in the source application server, or an apparatus that can be used together with the source application server. In a design, the apparatus may include a module corresponding to performing the method/operation/step/action described in any one of the fourth aspect and/or the possible implementations of the fourth aspect. The module may be implemented by a hardware circuit, software, or a combination of a hardware circuit and software. In a design, the apparatus may include a relocation unit and a transceiver unit.

According to a tenth aspect, this application provides a service packet transmission apparatus, configured to implement the method according to any one of the fifth aspect and/or the possible implementations of the fifth aspect. The apparatus may be a mobile edge computing application management network element, an apparatus in the mobile edge computing application management network element, or an apparatus that can be used together with the mobile edge computing application management network element. In a design, the apparatus may include a module corresponding to performing the method/operation/step/action described in any one of the fifth aspect and/or the possible implementations of the fifth aspect. The module may be implemented by a hardware circuit, software, or a combination of a hardware circuit and software. In a design, the apparatus may include a receiving unit and a sending unit, and the receiving unit and the sending unit may be one transceiver unit or different transceiver units.

According to an eleventh aspect, this application provides a service packet transmission apparatus. The apparatus includes a processor, configured to implement the method according to any one of the first aspect and/or the possible implementations of the first aspect. The apparatus may further include a memory. Optionally, the memory is configured to store instructions. When executing the instructions stored in the memory, the processor can implement the method according to any one of the first aspect and/or the possible implementations of the first aspect. The apparatus may further include a communication interface. The communication interface is used by the apparatus to communicate with another device. For example, the communication interface may be a transceiver, a circuit, a bus, a module, a pin, or another type of communication interface.

According to a twelfth aspect, this application provides a service packet transmission apparatus. The apparatus includes a processor, configured to implement the method according to any one of the second aspect and/or the possible implementations of the second aspect. The apparatus may further include a memory. Optionally, the memory is configured to store instructions. When executing the instructions stored in the memory, the processor can implement the method according to any one of the second aspect and/or the possible implementations of the second aspect. The apparatus may further include a communication interface, and the communication interface is used by the apparatus to communicate with another device.

According to a thirteenth aspect, this application provides a service packet transmission apparatus. The apparatus includes a processor, configured to implement the method according to any one of the third aspect and/or the possible implementations of the third aspect. The apparatus may further include a memory. Optionally, the memory is configured to store instructions. When executing the instructions stored in the memory, the processor can implement the method according to any one of the third aspect and/or the possible implementations of the third aspect. The apparatus may further include a communication interface. The communication interface is used by the apparatus to communicate with another device. For example, the communication interface may be a transceiver, a circuit, a bus, a module, a pin, or another type of communication interface.

According to a fourteenth aspect, this application provides a service packet transmission apparatus. The apparatus includes a processor, configured to implement the method according to any one of the fourth aspect and/or the possible implementations of the fourth aspect. The apparatus may further include a memory. Optionally, the memory is configured to store instructions. When executing the instructions stored in the memory, the processor can implement the method according to any one of the fourth aspect and/or the possible implementations of the fourth aspect. The apparatus may further include a communication interface, and the communication interface is used by the apparatus to communicate with another device.

According to a fifteenth aspect, this application provides a service packet transmission apparatus. The apparatus includes a processor, configured to implement the method according to any one of the fifth aspect and/or the possible implementations of the fifth aspect. The apparatus may further include a memory. Optionally, the memory is configured to store instructions. When executing the instructions stored in the memory, the processor can implement the method according to any one of the fifth aspect and/or the possible implementations of the fifth aspect. The apparatus may further include a communication interface, and the communication interface is used by the apparatus to communicate with another device.

According to a sixteenth aspect, this application provides a data transmission system. The system includes at least two of the apparatus according to the sixth aspect, the apparatus according to the seventh aspect, the apparatus according to the eighth aspect, the apparatus according to the ninth aspect, and the apparatus according to the tenth aspect, or the system includes at least two of the apparatus according to the eleventh aspect, the apparatus according to the twelfth aspect, the apparatus according to the thirteenth aspect, the apparatus according to the fourteenth aspect, and the apparatus according to the fifteenth aspect.

According to a seventeenth aspect, this application provides a computer-readable storage medium. The computer-readable storage medium stores computer instructions. When the computer instructions are run on a computer, the computer is enabled to perform the method according to any one of the foregoing aspect and the possible designs of the foregoing aspect.

According to an eighteenth aspect, this application provides a chip, including a processor. The processor is configured to perform the method according to any one of the foregoing aspect and the possible implementations of the foregoing aspect.

Optionally, the chip further includes a memory, and the memory is coupled to the processor.

Further, optionally, the chip further includes a communication interface.

According to a nineteenth aspect, this application provides a computer program product. The computer program product includes computer program code. When the computer program code is run on a computer, the computer is enabled to perform the method according to any one of the foregoing aspect and the possible designs of the foregoing aspect.

BRIEF DESCRIPTION OF THE DRAWINGS

FIG. 9A, FIG. 9B, and FIG. 9C are a schematic diagram of still another service packet transmission method according to an embodiment of this application;

FIG. 10A, FIG. 10B, and FIG. 10C are a schematic diagram of still another service packet transmission method according to an embodiment of this application;

DETAILED DESCRIPTION OF ILLUSTRATIVE EMBODIMENTS

The following describes the technical solutions in this application with reference to the accompanying drawings.

The technical solutions in the embodiments of this application may be used in various communication systems, for example, a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future 5th generation (5G) system, or a new radio (NR) system.

Figure 1:
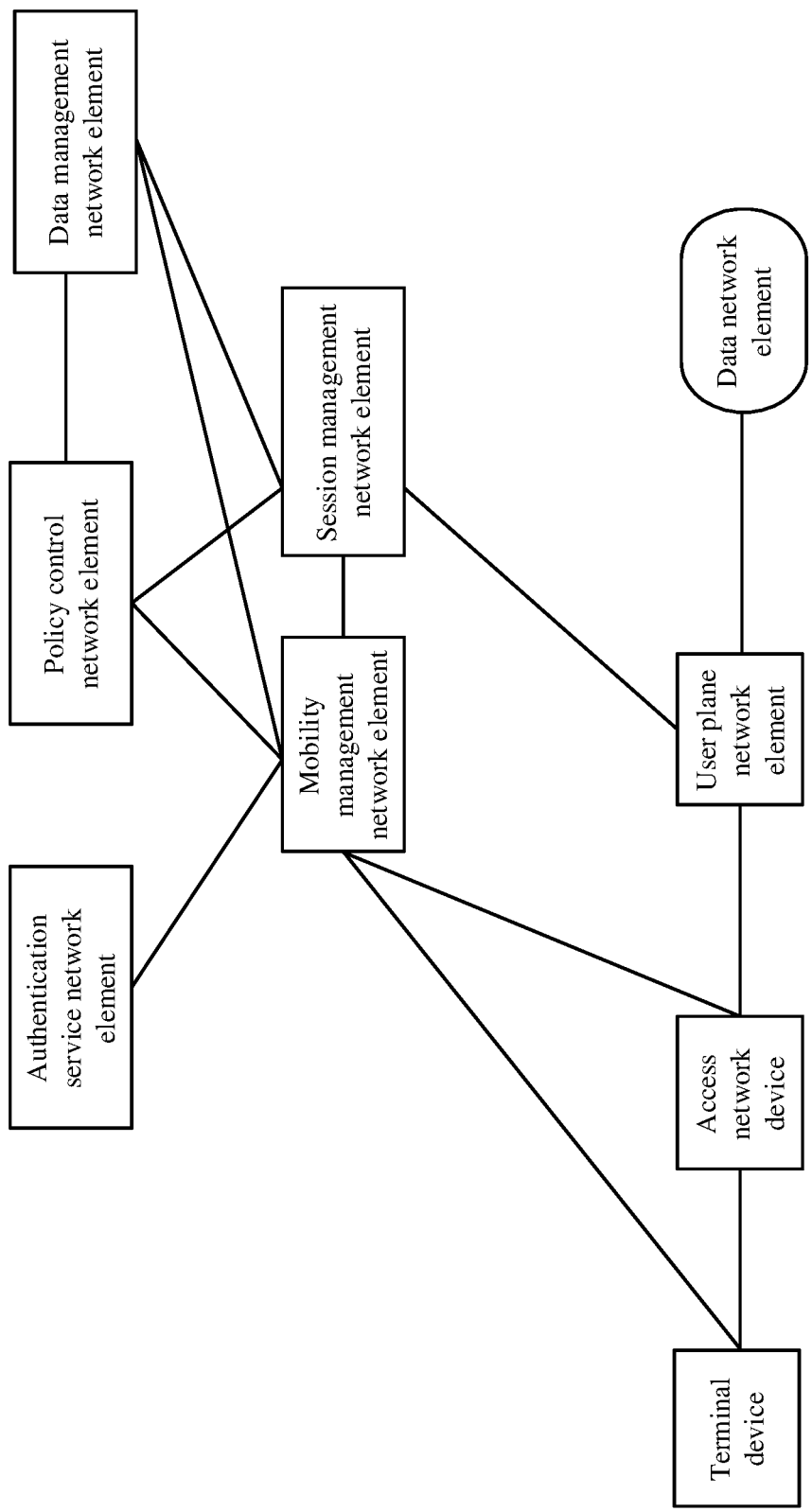
FIG. 1 is a schematic diagram of a system architecture according to an embodiment of this application.

FIG. 1 shows an example of a schematic diagram of an architecture of a communication system according to this application. As shown in FIG. 1, the architecture of the communication system includes a mobility management network element, a session management network element, a policy control network element, an authentication service network element, a data management network element, and a user plane network element. Further, the architecture of the communication system further includes an access network device, a terminal apparatus (UE), and a data network (DN) network element. The terminal apparatus may be connected to the mobility management network element. The access network device may also be connected to the mobility management network element. The access network device may further be connected to the user plane network element. The user plane network element may be connected to each of the session management network element and the data network. The mobility management network element may be connected to each of the session management network element, the data management network element, the policy control network element, and the authentication service network element. The session management network element is connected to each of the policy control network element and the data management network element. The mobility management network element and the session management network element each may obtain data, for example, user subscription data, from the data management network element. The mobility management network element and the session management network element each may obtain policy data from the policy control network element. For example, the policy control network element obtains the user subscription data from the data management network element and sends the user subscription data to the mobility management network element and the session management network element. Then, the mobility management network element and the session management network element deliver the user subscription data to the access network device, the terminal apparatus, the user plane network element, and the like.

The mobility management network element is mainly used for registration, mobility management, and a tracking area update procedure for a terminal apparatus in a mobile network. The mobility management network element terminates a non-access stratum (NAS) message, completes registration management, connection management, and reachability management, tracking area list (TA list) allocation, mobility management, and the like, and transparently routes a session management (SM) message to the session management network element. In 5th generation (5G) communication, the mobility management network element may be a core network access and mobility management function (AMF) network element. In future communication such as 6th generation (6G) communication, the mobility management network element may still be an AMF network element or have another name. This is not limited in this application.

The session management network element is mainly used for session management, for example, session creation, modification, and release, in a mobile network. Specific functions include, for example, allocating an internet protocol (IP) address to a user, or selecting a user plane network element that provides a packet forwarding function. In 5G, the session management network element may be a session management function (SMF) network element. In future communication such as 6G, the session management network element may still be the SMF network element or have another name. This is not limited in this application.

The policy control network element has a user subscription data management function, a policy control function, a charging policy control function, quality of service (QoS) control, and the like. In 5G, the policy control network element may be a policy control function (PCF) network element. In future communication such as 6G, the policy control network element may still be the PCF network element or have another name. This is not limited in this application.

The authentication server network element is mainly configured to use an extensible authentication protocol (EAP) to verify a service function and store a key, to implement authentication and authorization on a user. In 5G, the authentication server network element may be an authentication server function (AUSF) network element. In future communication such as 6G, the user plane network element may still be the AUSF network element or have another name. This is not limited in this application.

The data management network element is mainly configured to store user data, such as subscription information and authentication/authorization information. In 5G, the data management network element may be a unified data management (UDM) network element. In future communication such as 6G, the data management network element may still be the UDM network element or have another name. This is not limited in this application.

The user plane network element is mainly used for user plane service processing, for example, service routing, packet forwarding, an anchoring function, quality of service (QoS) mapping and execution, identification of an identifier of an uplink and routing to a data network, triggering of a notification of downlink packet buffering and downlink data arrival, and connecting to an external data network. There may be a plurality of user plane network elements, where a user plane network element connected to an application server (AS) is referred to as a protocol data unit session anchor (PDU session anchor, PSA), and the PDU is short for protocol data unit. In 5G, the user plane network element may be a user plane function (UPF) network element. In future communication such as 6G, the user plane network element may still be the UPF network element or have another name. This is not limited in this application.

The access network device may also be referred to as a radio access network (radio access network, RAN) device, and is a device that provides a wireless communication function for the terminal apparatus. The access network device includes but is not limited to a next generation NodeB (gNodeB, gNB), an evolved NodeB (eNB), a radio network controller (radio network controller, RNC), a NodeB (NB), a base station controller (base station controller, BSC), a base transceiver station (BTS), a home NodeB (for example, a home evolved NodeB or a home NodeB, HNB), a baseband unit (BBU), a transmission reception point (TRP), a transmission point (TP), a mobile switching center, and the like in 5G.

The terminal apparatus (UE) is a device having wireless transmission and reception functions. The terminal apparatus may be deployed on land, and includes an indoor device, an outdoor device, a handheld device, or a vehicle-mounted device, or may be deployed on a water surface (for example, on a ship), or may be deployed in the air (for example, on an airplane, a balloon, or a satellite). The terminal apparatus may be a mobile phone, a tablet (pad), a computer having wireless transmission and reception functions, a virtual reality (VR) terminal, an augmented reality (AR) terminal, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like.

The data network (DN) is mainly used to provide a service for a user, for example, a service of a carrier, an internet access service, or a third-party service.

It may be understood that the foregoing network elements or functions may be network elements in a hardware device, may be software functions running on dedicated hardware, or may be virtualized functions instantiated on a platform (for example, a cloud platform). One or more services may be obtained through division based on the foregoing network elements or functions. Further, a service independent of a network function may exist. In this application, an instance of the function, an instance of a service included in the function, or an instance of a service that exists independently of a network function may be referred to as a service instance.

It should be noted that a name of each network element included in FIG. 1 is merely a name, and the name does not limit a function of the network element. In a 5G network and another future network, the foregoing network elements may alternatively have other names. This is not specifically limited in the embodiments of this application. For example, in a 6G network, some or all of the foregoing network elements may still use terms in 5G, or may use other names, or the like. This is uniformly described herein. Details are not described in the following.

It should be noted that the network elements in FIG. 1 do not necessarily exist at the same time, and a required network element may be determined based on a requirement. A connection relationship between the network elements in FIG. 1 is not uniquely determined, and may be adjusted based on a requirement.

In this application, an example in which the user plane network element is the UPF, for example, a source UPF and a target UPF, is used for description. Optionally, the source UPF may be replaced with a source PSA, and the target UPF may be replaced with a target PSA. In this application, an example in which the session management network element is the SMF network element is used for description.

Figure 2:
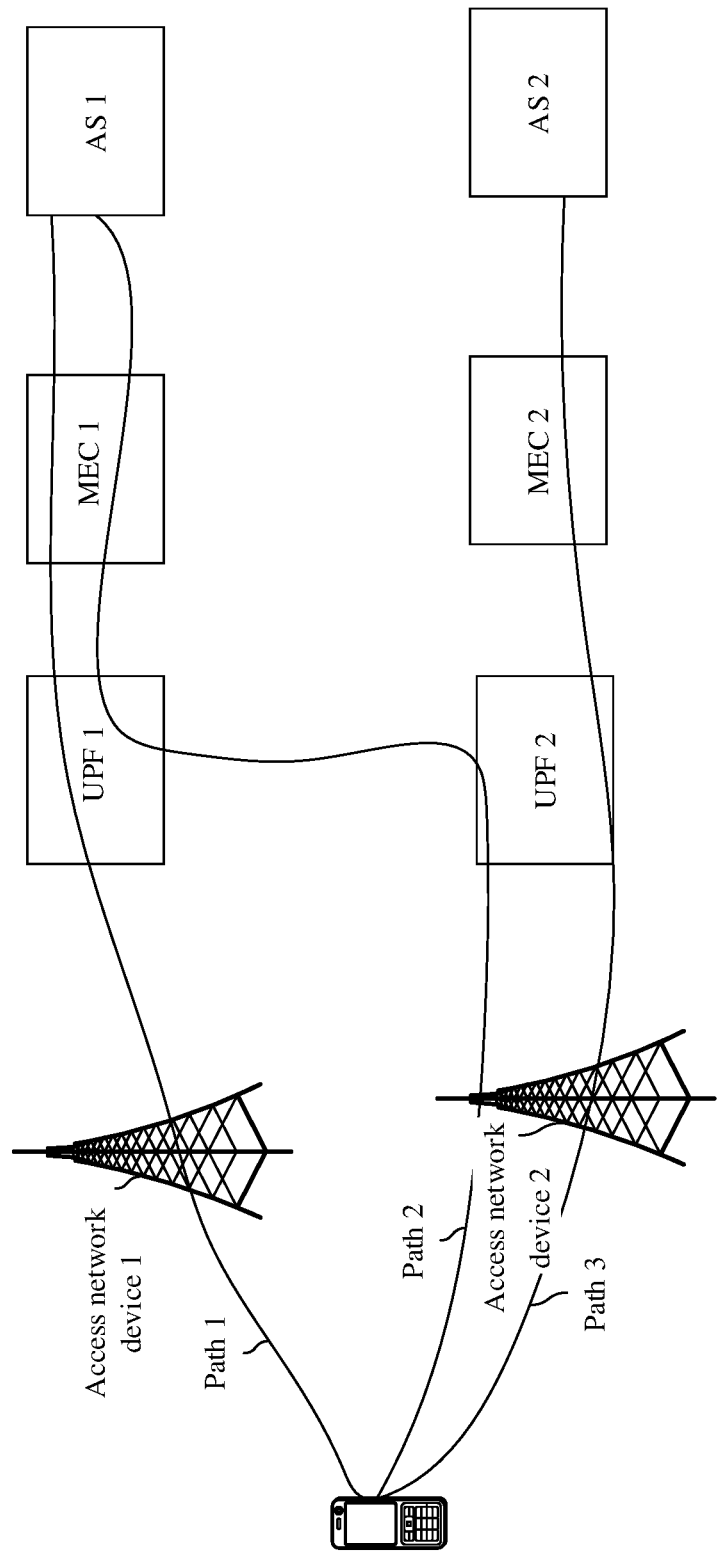
FIG. 2 is a schematic diagram of an application scenario according to an embodiment of this application.

FIG. 2 is a schematic diagram 200 of an application scenario according to an embodiment of this application. FIG. 2 is a schematic diagram of a mobile edge computing (MEC) network element based on the architecture in FIG. 1. The MEC network element is sinking deployed at a UPF. In this way, a low-latency and high-bandwidth service can be provided for a terminal apparatus. Specifically, FIG. 2 shows three transmission paths. An uplink service packet transmission process of a path 1 is: terminal apparatus-access network device 1-UPF 1-MEC 1-AS 1, and a downlink service packet transmission process is an inverse process of the uplink service packet transmission process. An uplink service packet transmission process of a path 2 is: terminal apparatus-access network device 2-UPF 2-UPF 1-MEC 1-AS 1, and a downlink service packet transmission process is an inverse process of the uplink service packet transmission process. An uplink service packet transmission process of a path 3 is: terminal apparatus-access network device 2-UPF 2-MEC 2-AS 2, and a downlink service packet transmission process is an inverse process of the uplink service packet transmission process. In a process in which the terminal apparatus (for example, UE 109 in FIG. 1) transmits a service packet through the path 1, a location of the terminal apparatus changes. When the terminal apparatus moves from a location covered by the access network device 1 to a location covered by the access network device 2, the terminal apparatus needs to be handed over to the access network device 2, that is, air interface handover is performed. In this case, the service packet is transmitted through the path 2. The packet on the path 2 arrives at the UPF 1 (also referred to as a source UPF) through the access network device 2, and then is finally transmitted to the AS 1 through the sink MEC 1. In this case, a transmission distance is relatively long, because the path 2 is the longest among the three transmission paths, a latency of the packet transmitted on the path 2 is relatively high. For example, for a packet of an ultra-reliable low-latency communication (URLLC) type, a low-latency requirement cannot be satisfied on the path 2. Therefore, it is necessary to switch the transmission path of the packet from the path 2 to the path 3, in other words, it is necessary to relocate a context of the terminal apparatus from the AS 1 to the AS 2. However, in a process of switching the transmission path of the packet from the path 2 to the path 3, the packet that is being transmitted on the path 2 may be lost due to a path switching operation. In this case, a packet loss rate is relatively high, and transmission performance is relatively poor. In addition, during path switching, the UPF 2 (also referred to as a target UPF) may simultaneously receive uplink service packets from the path 2 and the path 3. As a result, the packets received by the UPF 2 are out of order. This is a big problem for a service type that has a strict requirement on a packet order.

For the foregoing problem, according to a service packet transmission method provided in the embodiments of this application, a source UPF, a source MEC, a target UPF, and a target MEC are interacted. For a specific interaction process, refer to descriptions in the following embodiments. In a path switching process, an uplink service packet on the path 2 is accurately transmitted to the AS 2, and a downlink service packet on the path 2 is accurately transmitted to the terminal apparatus 210.

It should be noted that, functions of the MEC network element, for example, the source MEC network element and the target MEC network element, in the embodiments of this application include, on the one hand, the MEC network element supports forwarding of a user plane packet, can detect starting and ending of a service, and can sense a packet sequence number. On the other hand, the MEC network element can interact with a PCF and an SMF on a control plane, and a proxy AS or an application instance on the proxy AS subscribes to a data network access point identifier (DNAI) change notification from a network (the SMF or the PCF).

It should be noted that FIG. 2 is a simplified schematic diagram of MEC-based packet transmission. In an actual transmission process, another network element may further exist in FIG. 2. Because the another network element is irrelevant to this application, no detailed descriptions are provided.

It should be noted that transmission of an uplink service packet and transmission of a downlink service packet are described together in this application. However, this is not limited in the embodiments of this application. In an actual processing process, only transmission of an uplink service packet may exist, or only transmission of a downlink service packet may exist.

It should be noted that, for ease of description, "network element" is deleted. For example, the UPF represents the UPF network element, and the SMF represents the SMF network element.

Figure 3:
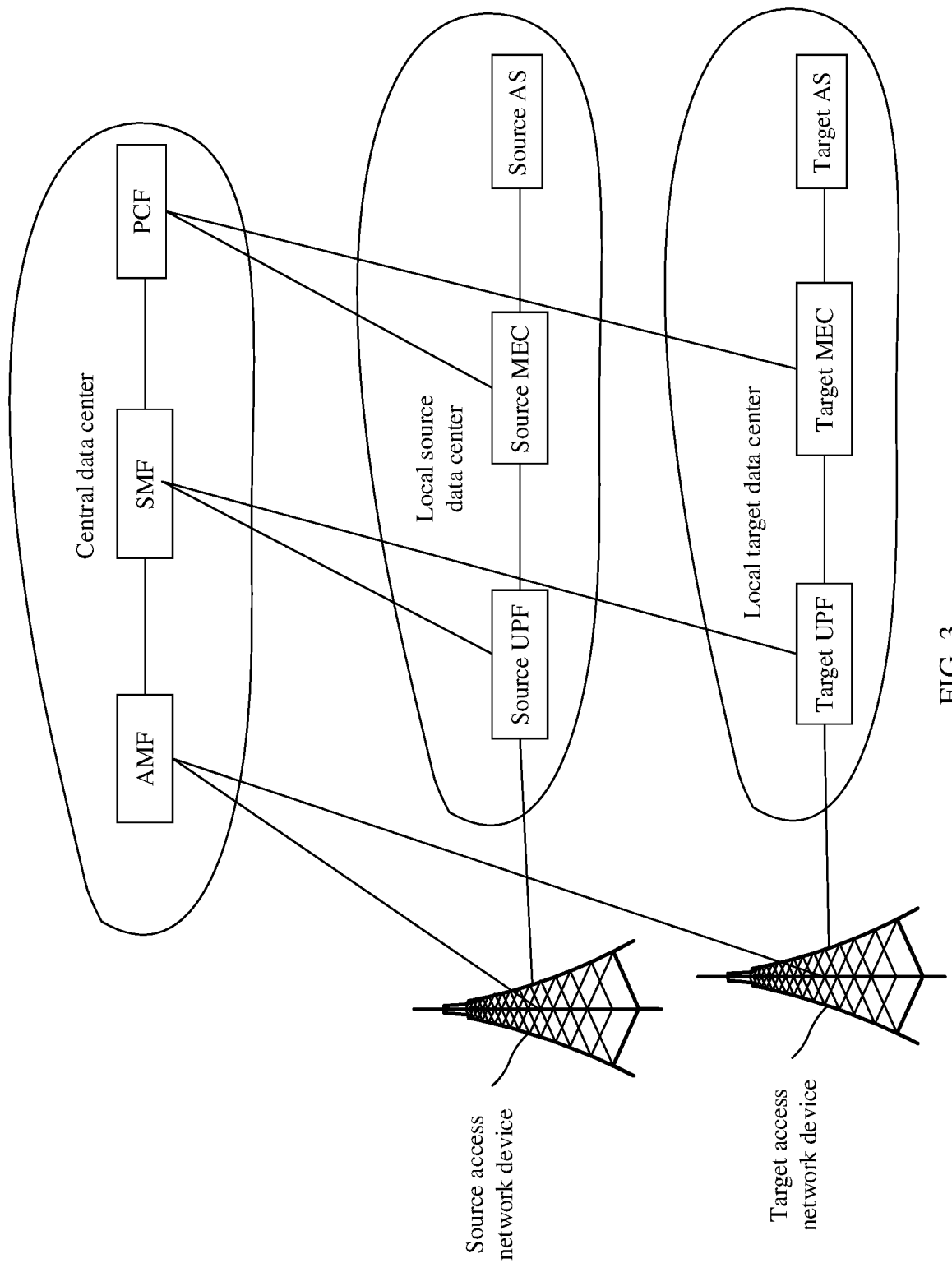
FIG. 3 is a schematic diagram of another application scenario according to an embodiment of this application.
Figure 4:
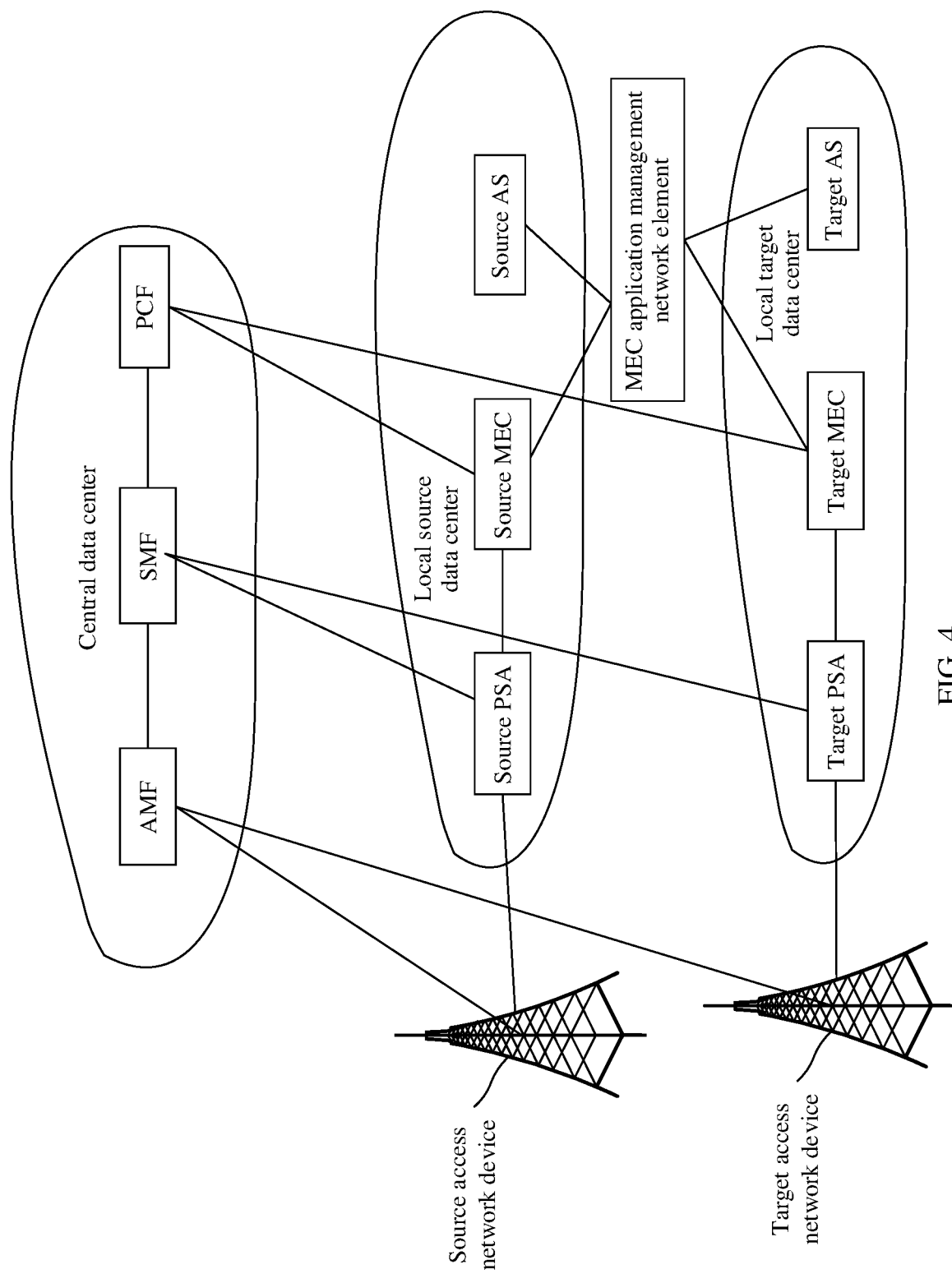
FIG. 4 is a schematic diagram of still another application scenario according to an embodiment of this application.

The following describes two application scenarios of the embodiments of this application with reference to FIG. 3 and FIG. 4.

As shown in FIG. 3, a central data center controls one or more local data centers. FIG. 3 shows only two local data centers (also referred to as a local source data center and a local target data center). The local source data center includes a source UPF, a source MEC, and a source AS. The local target data center includes a target UPF, a target MEC, and a target AS. However, this is not limited in this embodiment of this application. There is no SMF network element in each local data center.

Specifically, the central data center includes an SMF, a PCF, and an AMF. The SMF is configured to obtain policy data from the PCF, control the source UPF and the target UPF based on the policy data. The source MEC, the target MEC, and the PCF are interacted to provide an application requirement. For example, when a location of a terminal apparatus changes, to be specific, the terminal apparatus moves from coverage of a source access network device to coverage of a target access network device, the terminal apparatus performs air interface handover, and is handed over from the source access network device to the target access network device. In this case, the AMF may obtain access information that is of the terminal apparatus and that is sent by the target access device, and report the access information of the terminal apparatus to the SMF. The access information includes location information of the terminal apparatus. The SMF determines, based on the access information of the terminal apparatus, that a user plane function network element of the terminal apparatus needs to be handed over. When finding that an AS corresponding to a user plane function network element that needs to be handed over to also changes, the SMF or the PCF determines a data network access point identifier (DNAI) of the target AS. The SMF or the PCF sends the DNAI of the target AS and an identifier of the terminal apparatus to the source MEC (Optionally, the SMF or the PCF may alternatively send an identifier of an application of the terminal apparatus to the source MEC), so that the source MEC forwards the DNAI and the identifier of the terminal apparatus to the source AS, for the source AS to determine the target AS based on the DNAI. Therefore, the source AS and the target AS relocate a context of the terminal apparatus. For example, the SMF performs signaling transmission with the source AS and target AS through an NEF. It should be noted that, in FIG. 3, the central data center may further include an AF. The SMF may interact with the source AS and the target AS through the AF, and the SMF may interact with the AF through the NEF. To avoid repetition, the AF is not shown in this embodiment of this application.

As shown in FIG. 4, a central data center controls one or more local data centers. FIG. 4 shows only two local data centers (also referred to as a local source data center and a local target data center). The local source data center includes a source UPF, a source MEC, and a source AS. The local target data center includes a target UPF, a target MEC, and a target AS. However, this embodiment of this application is not limited thereto. There is no SMF network element in each local data center.

FIG. 4 is basically the same as FIG. 3. A difference lies in that an MEC application management network element is introduced in FIG. 4. For example, the MEC application management network element may be a virtualized network function manager (VNFM). The MEC application management network element is configured to manage the source AS and the target AS, including managing life cycles of application instances on the source AS and the target AS. For example, the MEC application management network element instantiates one MEC application instance, relocates one MEC application instance from the source AS to the target AS, and accepts registration of application instances on the source AS and the target AS. When the source MEC obtains a DNAI of the target AS and an identifier of an application of a terminal apparatus from the SMF or the PCF, the source MEC may determine an identifier of an application instance based on the identifier of the application of the terminal apparatus, and send the identifier of the application instance and the DNAI to the MEC application management network element. The MEC application management network element triggers the source AS and the target AS to relocate a context of the application instance, so that the context of the application instance can be relocated from the source AS to the target AS.

It should be noted that, in FIG. 4, the central data center may further include a control plane network element AF of an AS. The SMF may interact with the source AS and the target AS through the control plane network element AF of the AS, and the SMF may interact with the AF through the NEF.

Figure 5:
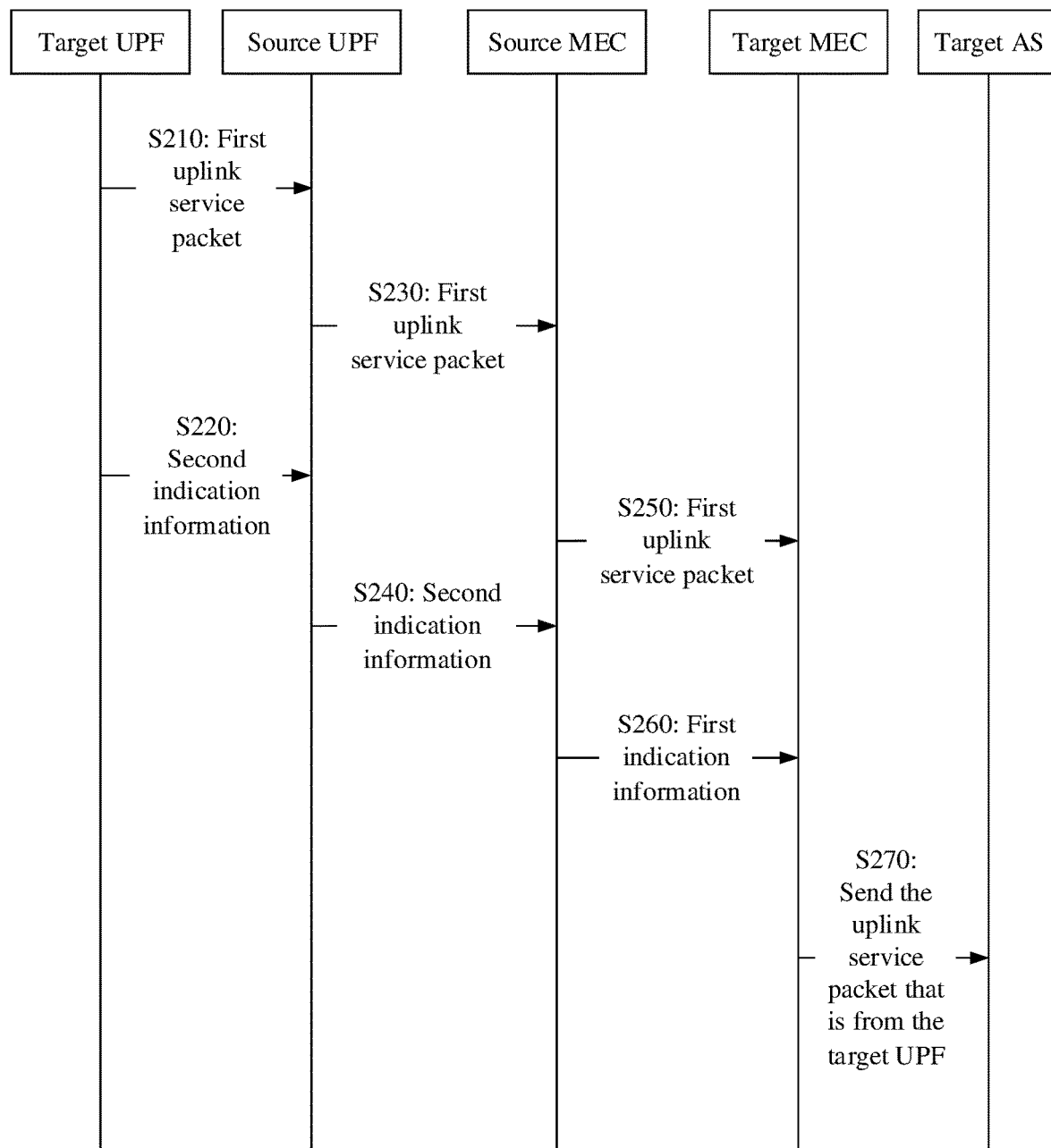
FIG. 5 is a schematic diagram of a service packet transmission method according to an embodiment of this application.

FIG. 5 shows a service packet transmission method 200 according to an embodiment of this application. The method 200 includes the following steps.

S210: A target UPF sends a first uplink service packet to a source UPF, and the source UPF receives the first uplink service packet sent by the target UPF. After the target UPF sends the first uplink service packet to the source UPF, the target UPF no longer sends an uplink service packet to the source UPF. That is, when receiving an uplink service packet, the target UPF directly sends the uplink service packet to a target MEC. In this way, in S270, after sending the first uplink service packet to a target AS, the target MEC sends, to the target AS, an uplink service packet that is directly from the target UPF.

S220: The target UPF sends second indication information to the source UPF, where the second indication information is used to indicate that the sending of the first uplink service packet by the target UPF ends.

S230: The source UPF sends the first uplink service packet to a source MEC, and the source MEC receives the first uplink service packet sent by the source UPF.

S240: The source UPF sends the second indication information to the source MEC, and the source MEC receives the second indication information sent by the source UPF.

S250: The source MEC network element sends the first uplink service packet to the target MEC network element, and the target MEC receives the first uplink service packet from the source MEC, where the first uplink service packet is an uplink service packet received by the source MEC network element after the source MEC network element receives a second uplink service packet, and the second uplink service packet is the last uplink service packet sent by the source MEC network element to a source AS.

S260: After the source MEC receives the second indication information, the source MEC sends first indication information to the target MEC, and the target MEC receives the first indication information from the source MEC, where the first indication information is used to indicate that sending of the first uplink service packet by the source MEC ends. In this way, the target MEC can determine that the sending of the uplink service packet that is from the source MEC ends.

It should be noted that the first indication information and the second indication information may be signaling between different network elements, but the first indication information and the second indication information may include a same information element, to be specific, the same information element may be an identifier indicating that the sending of the uplink service packet ends. In other words, after the target user plane network element sends the second indication information to the source user plane network element, and after the source user plane network element forwards the second indication information to the source mobile edge computing network element, the source mobile edge computing network element may determine that the sending of the uplink service packet that is from the target user plane network element ends. That is, the source user plane network element no longer sends, to the source mobile edge computing network element, an uplink service packet that is from the target user plane network element. After the source mobile edge computing network element sends the first indication information to the target mobile edge computing network element, the target mobile edge computing network element may determine that the sending of the uplink service packet that is from the source mobile edge computing network element ends. That is, the source mobile edge computing network element no longer sends an uplink service packet to the target mobile edge computing network element.

In other words, the target UPF first sends the second indication information to the source UPF to indicate that the sending of the first uplink service packet that is sent by the target UPF ends, and the source UPF may forward the second indication information to the source MEC. The source MEC sends the information element in the second indication information as the information element of the first indication information to the target MEC. In this way, the target MEC can learn that the sending of the first uplink service packet that is from the source MEC also ends. Certainly, the first indication information and the second indication information are used to distinguish between signaling between different network elements. In an actual processing process, the first indication information and the second indication information may alternatively be same indication information. To be specific, the target UPF first sends the indication information to the source UPF, then the source UPF sends the indication information to the source MEC, and the source MEC sends the indication information to the target MEC. In other words, the first indication information or the second indication information may indicate that sending of the uplink service packet on an original path or an old path ends. The original path or the old path is target UPF-source UPF-source MEC-target MEC. Regardless of whether the source MEC receives the second indication information or the target MEC receives the first indication information, the source MEC and the target UPF may determine that there is no uplink service packet any longer on the original path or the old path.

Optionally, an order of the second indication information and the first uplink service packet (S210 and S220, or S230 and S240) is the same as an order of the first indication information and the first uplink service packet (S250 and S260). In other words, if the first uplink service packet in S210 is before the second indication information in S220, the first uplink service packet in S230 is also before the second indication information in S240, and the first uplink service packet in S250 is also before the first indication information in S260. If the first uplink service packet in S210 and the second indication information in S220 are simultaneously sent, the first uplink service packet in S230 and the second indication information in S240 are also simultaneously sent, and the first uplink service packet in S250 and the first indication information in S260 are also simultaneously sent. The following two cases are described.

Case 1: The target UPF may simultaneously send the first uplink service packet in S210 and the second indication information in S220 to the source UPF. For example, if the first uplink service packet is the last uplink service packet sent by the target UPF to the source UPF, the second indication information may be encapsulated into a packet header of the first uplink service packet and sent to the source UPF. Similarly, the source UPF may simultaneously send the first uplink service packet in S230 and the second indication information in S240 to the source MEC. For example, if the first uplink service packet is the last uplink service packet sent by the source UPF to the source MEC, the second indication information may be encapsulated into a packet header of the first uplink service packet and sent to the source MEC. Similarly, the source MEC may simultaneously send the first uplink service packet in S250 and the first indication information in S260 to the target MEC. For example, if the first uplink service packet is the last uplink service packet sent by the source MEC to the target MEC, the first indication information may be encapsulated into a packet header of the first uplink service packet and sent to the target MEC. Case 2: The target UPF first sends the first uplink service packet to the source UPF, and then sends an uplink service packet carrying the second indication information. Similarly, the source UPF may first send the first uplink service packet to the source MEC, and then send an uplink service packet carrying the second indication information. The source MEC may first send the first uplink service packet to the target MEC, and then send an uplink service packet carrying the first indication information. For example, the uplink service packet carrying the first indication information or the uplink service packet carrying the second indication information has a same data packet format as the first uplink service packet. For example, the first uplink service packet is a general packet radio service tunneling protocol (GPRS tunneling protocol, GTP) data packet, where the GPRS represents a general packet radio service (GPRS), and the GTP data packet includes a GTP for the user plane (GTP-U) header. In this case, the uplink service packet carrying the first indication information and the uplink service packet carrying the second indication information are also GTP data packets, and the first indication information may be set in a specific flag bit of a GTP-U header. For example, the specific flag bit is set to "0" or "1". Except for the specific flag bit, GTP-U headers of the uplink packet carrying the first indication information and the uplink service packet carrying the second indication information are the same as that of the first uplink service packet.

S270: After the target MEC network element receives the first indication information, the target MEC network element sends, to the target AS after the first uplink service packet is sent, the uplink service packet that is sent by the target UPF network element to the target MEC network element.

Therefore, in this embodiment of this application, the target UPF sends the first uplink service packet and the second indication information to the source UPF. After sending the first uplink service packet to the source UPF, the target UPF no longer sends the uplink service packet to the source UPF. The source UPF forwards the first uplink service packet and the second indication information to the source MEC, and after sending the last second uplink service packet to the source AS, the source MEC sends the first uplink service packet after the second uplink service packet to the target AS by using the target MEC, so that loss of the first uplink service packet can be avoided, and the source MEC may send the first indication information to the target MEC, to indicate that the sending of the first uplink service packet by the source MEC ends. In this way, the target MEC can be prevented from keeping waiting to receive an uplink service packet sent by the source MEC. After receiving the first indication information, and after sending, to the target AS, the uplink service packet that is from the source MEC, the target MEC sends the uplink service packet that is sent by the target UPF to the target MEC, to avoid an out-of-order problem of uplink service packets.

Figure 6:
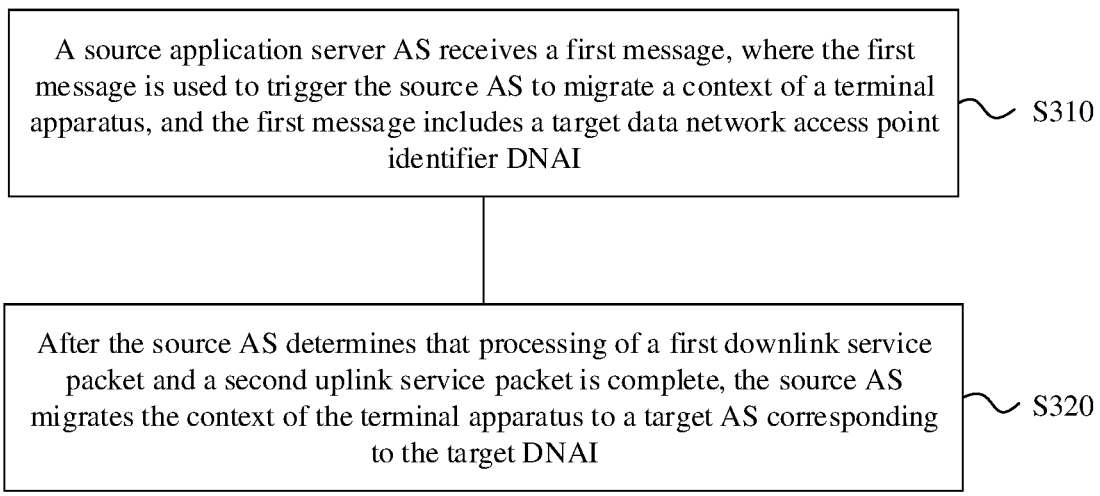
FIG. 6 is a schematic diagram of another service packet transmission method according to an embodiment of this application.

FIG. 6 shows a service packet transmission method 300 according to an embodiment of this application. The method 300 includes the following steps.

S310: A source application server AS receives a first message, where the first message is used to trigger the source AS to relocate a context of a terminal apparatus, and the first message includes a target DNAI.

Optionally, the source AS may receive the first message sent by a source MEC. For example, the first message may be a context relocation request message, and is used to request the source AS to relocate the context of the terminal apparatus. Optionally, the source AS may receive the first message sent by an MEC application management network element. For example, the first message may be a second trigger message in a method 400.

S320: After the source AS determines that processing of a first downlink service packet and a second uplink service packet is complete, the source AS relocates the context of the terminal apparatus to a target AS corresponding to the target DNAI, where the first downlink service packet is the last downlink service packet sent by the source AS to the source mobile edge computing MEC network element, and the second uplink service packet is the last uplink service packet sent by the source MEC network element to the source AS.

In this embodiment of this application, after receiving the first message, the source AS may determine that the context of the terminal apparatus needs to be relocated. After determining that the context of the terminal apparatus needs to be relocated, and after the source AS determines that processing of the last downlink service packet (the first downlink service packet) and the last received uplink service packet (the second uplink service packet) is complete, the source AS determines the corresponding target AS based on the target DNAI in the first information, and relocates the context of the terminal apparatus to the target AS. In this way, after the context of the terminal apparatus is relocated to the target AS, continuous transmission of uplink and downlink service packets of the terminal apparatus can be ensured.

It should be noted that, the context relocation of the terminal apparatus in the present invention is relocation of an application instance or relocation of contexts of a transport layer and an application layer of the terminal apparatus, and may be specifically overall relocation of a specific application instance of the terminal apparatus. For example, when one MEC application instance serves only one UE, the context relocation is relocating an entire application instance that is of the terminal apparatus and that is related to a data network (DN) from one AS to another AS, or may be relocating the contexts of the transport layer and the application layer of the terminal apparatus. For example, when a plurality of terminal apparatuses share one MEC application instance, the context relocation of the terminal apparatus is relocating, from one AS to another AS, contexts of a transport layer and an application layer of an application that is of the terminal apparatus and that needs to be relocated.

Figure 7:
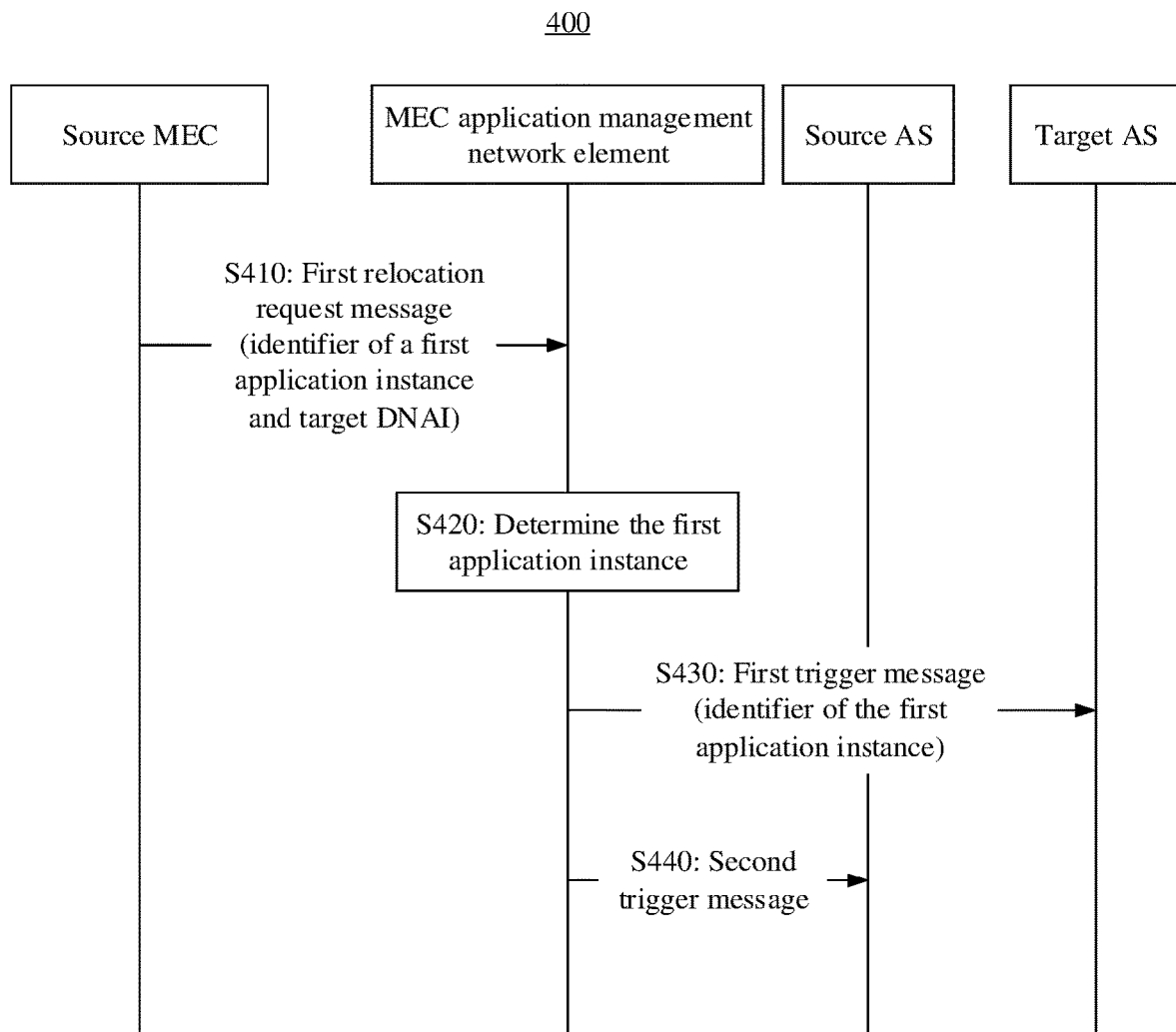
FIG. 7 is a schematic diagram of still another service packet transmission method according to an embodiment of this application.

FIG. 7 shows a service packet transmission method 400 according to an embodiment of this application. The method 400 includes the following steps.

S410: A source MEC sends a first relocation request message to an MEC application management network element, and the MEC application management network element receives the first relocation request message sent by the source MEC network element, where the first relocation request message includes an identifier of a first application instance and a target data network access point identifier DNAI.

For example, the MEC application management network element may be a VNFM.

S420: The MEC application management network element determines, based on the identifier of the first application instance, the first application instance that is to be relocated.

S430: The MEC application management network element sends a first trigger message to a target AS corresponding to the target DNAI, where the first trigger message includes the identifier of the first application instance, and the first trigger message is used to trigger the target AS to relocate the application instance.

S440: The MEC application management network element sends a second trigger message to a source AS corresponding to a source application instance, and the source AS receives the second trigger message, where the second trigger message is used to trigger the source AS to relocate the first application instance.

Specifically, one application instance identifier corresponds to one application instance, and the first relocation request message sent by the source MEC to the MEC application management network element includes the identifier of the first application instance. In this way, the MEC application management network element may determine, based on the identifier of the first application instance, the first application instance that is to be relocated, may determine the source AS in which the first application instance is located, that is, determine an AS running the first application instance as the source AS, and sends the second trigger message to the source AS, to trigger the source AS to relocate the first application instance. The MEC application management network element may send the identifier of the first application instance to the target AS via the first trigger message. In this way, a context of the first application instance can be relocated from the source AS to the target AS.

Optionally, before S430, after determining the target AS corresponding to the target DNAI, the MEC application management network element may create a virtual resource of the first application instance on the target AS, so that the target AS relocates the first application instance based on the virtual resource.

Figure 8A:
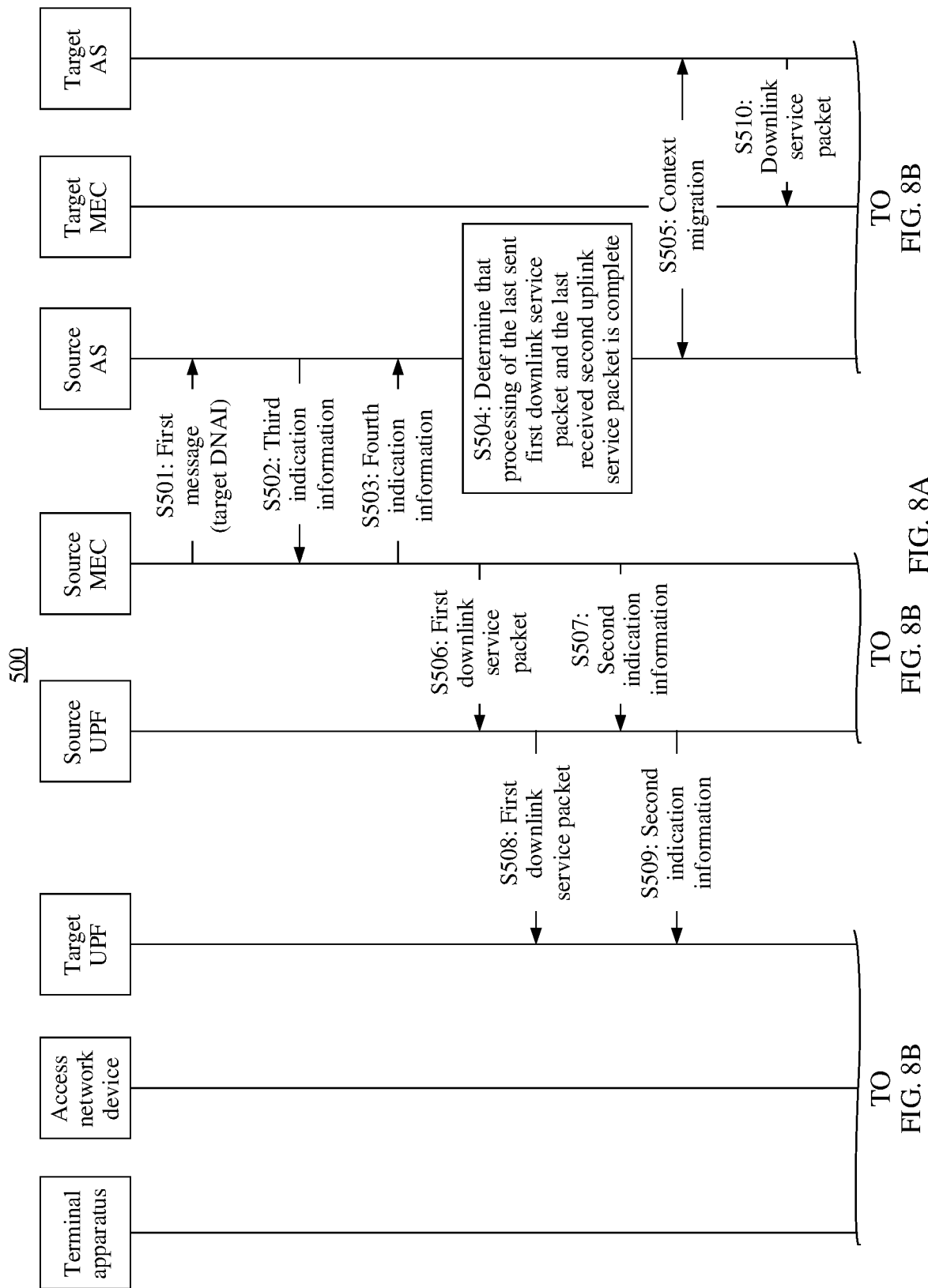
FIG. 8A and FIG. 8B are a schematic diagram of still another service packet transmission method according to an embodiment of this application.
Figure 8B:
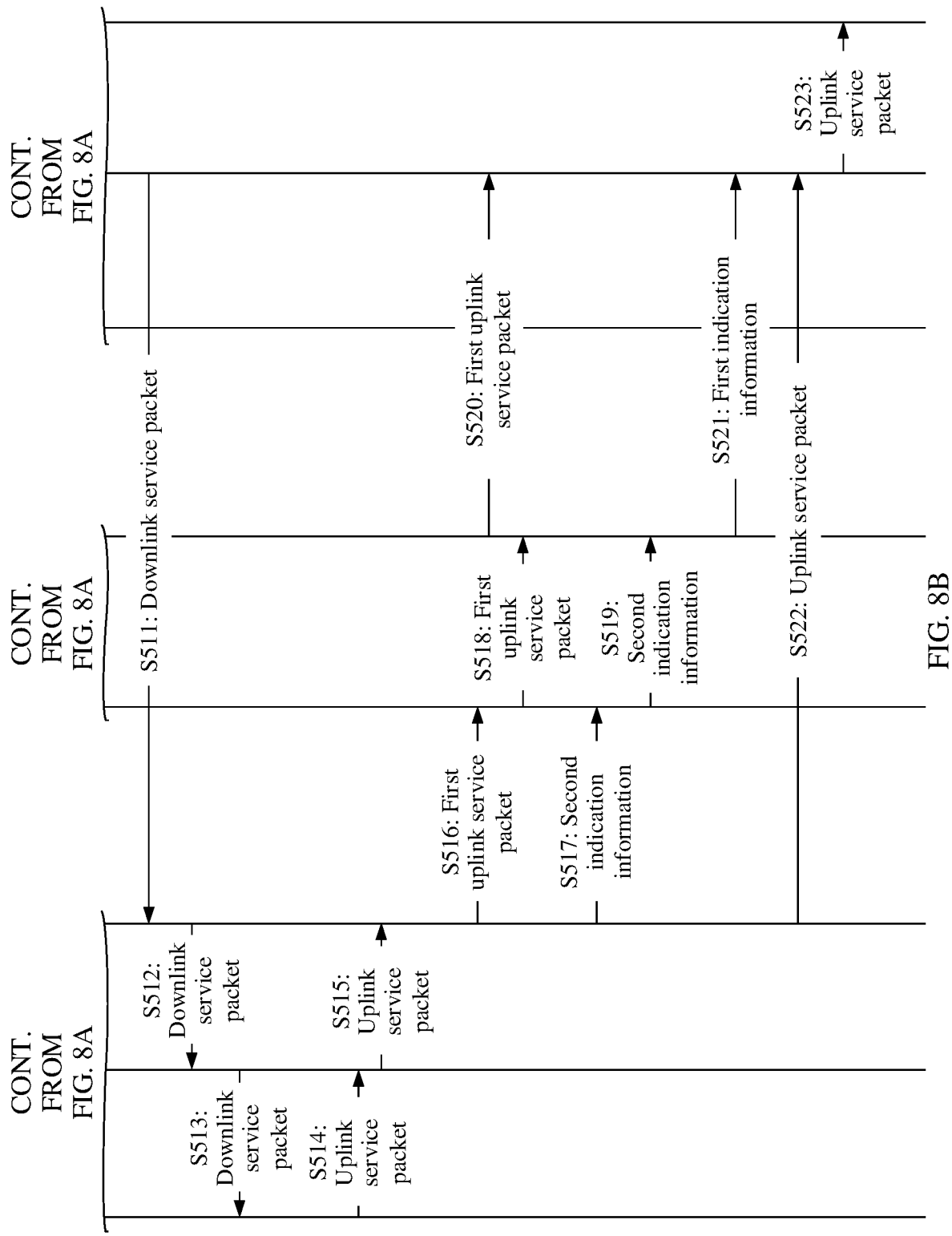

FIG. 8A and FIG. 8B show a service packet transmission method 500 according to an embodiment of this application. The method 500 includes the following steps.

S501: A source MEC network element sends a first message to a source AS, and the source AS receives the first message sent by the source MEC, where the first message includes a target DNAI. For example, the first message may be a fourth relocation request message mentioned below, and is used to request the source AS to relocate a context of a terminal apparatus.

In an alternative manner of S501, an MEC application management network element may send the first message to the source AS. For example, the first message may be the foregoing second trigger message, and is used to trigger the source AS to relocate a first application instance.

S502: After receiving the first message, the source AS determines that the last downlink service packet sent by the source AS to the source MEC is a first downlink service packet, the source AS sends fourth indication information to the source MEC, and the source MEC receives the fourth indication information sent by the source AS, where the fourth indication information is used to indicate that the first downlink service packet is the last downlink service packet from the source AS. For example, the fourth indication information may be a sequence number of the first downlink service packet.

Optionally, before sending the fourth indication information to the source MEC, the source AS may send the first downlink service packet to the source MEC. Optionally, after sending the fourth indication information to the source MEC, the source AS sends the first downlink service packet to the source MEC. Optionally, the source AS simultaneously sends the fourth indication information and the first downlink service packet to the source MEC. For example, the fourth indication information may be included in a packet header of the first downlink service packet. Regardless of a sending order of the fourth indication information and the first downlink service packet, the source AS no longer sends a downlink service packet to a source UPF after sending the first downlink service packet to the source MEC.

Optionally, in S502, after receiving the first message, the source AS may pre-freeze the context of the terminal apparatus, for example, interact with a target AS to prepare to relocate the context of the terminal apparatus. In this way, duration of the relocation of the context of the terminal apparatus can be shortened.

S503: After receiving the fourth indication information sent by the source AS, the source MEC sends fifth indication information to the source AS, and the source AS receives the fifth indication information sent by the source MEC, where the fifth indication information is used to indicate that a second uplink service packet is the last uplink service packet sent by the source MEC to the source AS. For example, the fifth indication information may be a sequence number of the second uplink service packet.

Optionally, in S502 and S503, a management network element of the source AS may send the fourth indication information to the source MEC. Optionally, the source MEC may send the fifth indication information to the management network element of the source AS, and then the management network element of the source AS forwards the fifth indication information to the source AS.

S504: After receiving the fifth indication information, the source AS may determine that the second uplink service packet is the last uplink service packet from the source MEC, and the source AS determines that processing of the first downlink service packet and the second uplink service packet is complete.

Specifically, after receiving the second uplink service packet and replying with an acknowledgment message of the second uplink service packet, the source AS may determine that the processing of the second uplink service packet is complete. After sending the first downlink service packet and receiving an acknowledgment message of the first downlink service packet, the source AS may determine that the processing of the first downlink service packet is complete. Alternatively, when receiving the second uplink service packet, the source AS may consider that the processing of the second uplink service packet is complete, and after sending the first downlink service packet, the source AS may consider that the processing of the first downlink service packet is complete.

S505: After processing the first downlink service packet and the second uplink service packet, the source AS relocates the context of the terminal apparatus to the target AS corresponding to the target DNAI.

S506: After receiving the first downlink service packet sent by the source AS, the source MEC sends the first downlink service packet to the source UPF, and the source UPF receives the first downlink service packet sent by the source MEC.

S507: The source MEC sends third indication information to the source UPF, and the source UPF receives the third indication information sent by the source MEC, where the third indication information is used to indicate that the sending of the downlink service packet that is from the source AS ends.

It should be noted that the source MEC may first send the first downlink service packet, and then send a downlink packet carrying the third indication information. The downlink packet carrying the third indication information has a same data packet format as the first downlink service packet. For example, if the first downlink service packet is a GTP data packet and includes a GTP-U header, the downlink packet carrying the third indication information is also a GTP data packet, and the third indication information may be set in a specific flag bit of a GTP-U header. For example, the specific flag bit is set to "o" or "1". Except for the specific flag bit, the GTP-U header of the downlink packet carrying the third indication information is the same as that of the first downlink service packet. Optionally, the source MEC may simultaneously send the first downlink service packet and the third indication information to the source UPF, for example, encapsulate the third indication information into a packet header of the first downlink service packet. It should further be noted that the context relocation between the source AS and the target AS and the sending of the first downlink service packet and the third indication information from the source MEC to the source UPF may be performed simultaneously or sequentially. In other words, S504 and S505 may be performed before, after, or simultaneously with S506 and S507.

S508: The source UPF sends the first downlink service packet to a target UPF, and the target UPF receives the first downlink service packet sent by the source UPF.

S509: The source UPF sends the third indication information to the target UPF, and the target UPF receives the third indication information sent by the source UPF.

It should be noted that, if the source MEC first sends the first downlink service packet and then sends the downlink packet carrying the third indication information in S506 and S507, the source UPF may also send the first downlink service packet, and then send the downlink packet carrying the third indication information, that is, S508 is first performed, and then S509 is performed. If the source MEC simultaneously sends the first downlink service packet and the third indication information to the source UPF in S506 and S507, in S508 and S509, the source UPF simultaneously sends, to the target UPF, the first downlink service packet and the third indication information that are received from the source MEC.

S510: After the source AS and the target AS relocate the context of the terminal apparatus, and after a link between the target AS and a target MEC is established, the target AS may send a downlink service packet of the terminal apparatus to the target MEC.

S511: The target MEC sends the downlink service packet in S510 to the target UPF.

S512: If the target UPF receives both the first downlink service packet in S506 and the downlink service packet that is from the target MEC, the target UPF immediately sends, to an access network device, the first downlink service packet that is from the source AS. If the target UPF has a downlink service packet from the target MEC before receiving the third indication information, the target UPF buffers the downlink service packet that is from the target MEC. After receiving the third indication information, and after determining that the first downlink service packet is sent to the access network device, the target UPF sends, to the access network device, the downlink service packet that is from the target MEC. In this way, it can be ensured that the downlink service packet from the source AS is preferentially transmitted, and then the downlink service packet from the target AS is transmitted. This prevents downlink service packets from being out of order.

S513: The access network device sends the downlink service packet received in S512 to the terminal apparatus through an air interface.

S514: The terminal apparatus does not sense network element handover on a network side, and the terminal apparatus may also send an uplink service packet to the access network device when receiving the downlink service packet.

It should be noted that an order of S514 and any one of the foregoing steps is not limited. When the terminal apparatus needs to send the uplink service packet, S514 is performed, and no order limitation is imposed.

S515: The access network device sends, to the target UPF, the uplink service packet that is from the terminal apparatus.

Similarly, S515 only needs to be performed after S514, and an order of S515 and the foregoing other steps is not limited. When receiving the uplink service packet sent by the terminal apparatus, and the access network device needs to send the uplink service packet to the target UPF, S515 is performed, and no order limitation is imposed.

S516: After receiving the uplink service packet sent by the access network device, the target UPF sends a first uplink service packet to the source UPF, where the target UPF no longer sends an uplink service packet to the source UPF after receiving the third indication information.

S517: After receiving the third indication information, the target UPF sends second indication information to the source UPF, where the first indication information is used to indicate that the sending of the first uplink service packet by the target UPF ends, that is, the target UPF no longer sends the uplink service packet to the source UPF.

In an alternative manner of S517, after receiving the downlink service packet from the target MEC or receiving a context relocation complete message sent by the target MEC, the target UPF sends the second indication information to the source UPF.

In other words, the target UPF may send the second indication information to the source UPF in two cases. Case 1: After receiving the third indication information sent by the source UPF, the target UPF sends the second indication information to the source UPF. Case 2: After receiving the downlink service packet from the target MEC or receiving the context relocation complete message sent by the target MEC, the target UPF sends the second indication information to the source UPF.

Optionally, the second indication information may be sent after the last first uplink service packet, to be specific, the target UPF first sends the first uplink service packet to the source UPF, and then sends an uplink packet carrying the second indication information. The uplink packet carrying the second indication information has a same data packet format as the first uplink service packet. For example, if the first uplink service packet is a GTP data packet and includes a GTP-U header, the uplink service packet carrying the second indication information is also a GTP data packet, and the second indication information may be set in a specific flag bit of a GTP-U header. For example, the specific flag bit is set to "o" or "i". Except for the specific flag bit, the GTP-U header of the uplink packet carrying the second indication information is the same as that of the first uplink service packet. Optionally, the target UPF may alternatively encapsulate the second indication information into a packet header of the last first uplink service packet and send the first uplink service packet to the source UPF.

S518: When receiving the first uplink service packet from the target UPF, the source UPF forwards the first uplink service packet to the source MEC, and the source MEC receives the first uplink service packet from the source UPF.

S519: The source UPF further forwards, to the source MEC, the second indication information that is from the target UPF, and the source MEC receives the second indication information from the source UPF.

S520: After sending the fifth indication information to the source AS, and when receiving the first uplink service packet from the target UPF, the source MEC forwards the first uplink service packet to the target MEC.

S521: After receiving the second indication information, the source MEC sends first indication information to the target MEC. In this way, the target MEC may determine, by using the first indication information, that sending of the uplink service packet that is from the source MEC ends. For related descriptions of the first indication information and the second indication information, refer to the descriptions in the method 200.

It should be noted that the source UPF sequentially sends the first uplink service packet and the second indication information to the source MEC, that is, the source UPF sends the first uplink service packet and the second indication information to the source MEC in an order of receiving the first uplink service packet and the second indication information. The source MEC sequentially sends the first uplink service packet and the first indication information to the target MEC, where an order relationship between the second indication information and the first uplink service packet is the same as an order relationship between the first indication information and the uplink service packet. If the source MEC first receives the first uplink service packet sent by the source UPF and then receives the second indication information sent by the source UPF, the source MEC first sends the first uplink packet and then sends the first indication information to the target MEC. In other words, the source MEC sends the first uplink service packet and the first indication information to the target MEC in the order of receiving the first uplink service packet and the second indication information.

S522: After sending the first uplink service packet and the second indication information to the source UPF, the target UPF no longer sends an uplink service packet to the source UPF. When receiving an uplink service packet from the access network device again, the target UPF needs to send the uplink service packet to the target MEC.

S523: After the target MEC establishes an uplink to the target AS, the target MEC may send uplink service packets to the target AS. Specifically, a sending process is that the first uplink service packet, namely, the uplink service packet from the source MEC, is first sent, and then the uplink access packet from the target UPF is sent. In other words, the first uplink service packet in S520 is first sent, and then the uplink service packet in S522 is sent.

To better describe S515 to S523, the following provides an example for description. It is assumed that in S515, service packets sequentially sent by the access network device to the target UPF are a packet 1, a packet 2, a packet 3, a packet 4, and a packet 5, and the target UPF sequentially receives the five packets. The following describes two cases. Case 1: When the target UPF receives the third indication information sent by the source UPF, the target UPF has sequentially sent the packet 1, the packet 2, and the packet 3 to the source UPF. The target UPF determines, based on the third indication information, that the target UPF no longer sends an uplink service packet to the source UPF, to be specific, the target UPF sends the second indication information to the source UPF, to indicate that the sending of the uplink service packet that is from the target UPF ends. The target UPF sequentially sends the packet 4 and the packet 5 to the target MEC. In this case, the packet 1, the packet 2, and the packet 3 are first uplink service packets. After sequentially receiving the packet 1, the packet 2, the packet 3, and the second indication information, the source UPF sequentially sends the packet 1, the packet 2, the packet 3, and the second indication information to the source MEC. After sequentially receiving the packet 1, the packet 2, the packet 3, and the second indication information, the source MEC sequentially sends the packet 1, the packet 2, the packet 3, and the first indication information (a position of the first indication information in the packets is the same as that of the second indication information in the packets) to the target MEC. The target MEC sequentially sends the packet 1, the packet 2, and the packet 3 to the target AS. After receiving the first indication information, and after sequentially sending the packet 1, the packet 2, and the packet 3 to the target AS, the target MEC sends the packet 4 and packet 5 that are from the target UPF. Case 2: When receiving the third indication information sent by the source UPF, the target UPF determines that a service packet last sent to the source UPF is the packet 4, encapsulates the second indication information into a packet header of the packet 4, and sends the packet 4 to the source UPF. The target UPF sends the packet 5 to the target MEC. In this case, the packet 1, the packet 2, the packet 3, and the packet 4 are first uplink service packets. After sequentially receiving the packet 1, the packet 2, the packet 3, and the packet 4, the source UPF sequentially sends the packet 1, the packet 2, the packet 3, and the packet 4 to the source MEC. The source MEC sequentially sends the packet 1, the packet 2, the packet 3, and the packet 4 to the target MEC (where in this case, the second indication information in the packet 4 is replaced with the first indication information). After parsing out the first indication information from the packet header of the packet 4, and after sequentially sending the packet 1, the packet 2, the packet 3, and the packet 4 to the target AS, the target MEC sends the packet 5 that is from the target UPF.

It should be noted that the first uplink service packet is an uplink service packet that has been sent to the source UPF or the source MEC but has not been forwarded to the source AS in a context relocation process of the terminal apparatus. A packet that has been sent to the source UPF or the source MEC may also be referred to as a packet on an old path or an original path. In this case, the packet on the old path or the original path needs to be forwarded to the target MEC, and forwarded to the target AS by using the target MEC, to avoid loss of the uplink service packet. In addition, the first indication information is used to indicate that sending of the packet on the old path or the original path ends. In this way, the target MEC ensures to send the uplink service packet from the target UPF after sending the uplink service packet on the old path or the original path. This can avoid an out-of-order problem of uplink service packets.

Figure 9B:
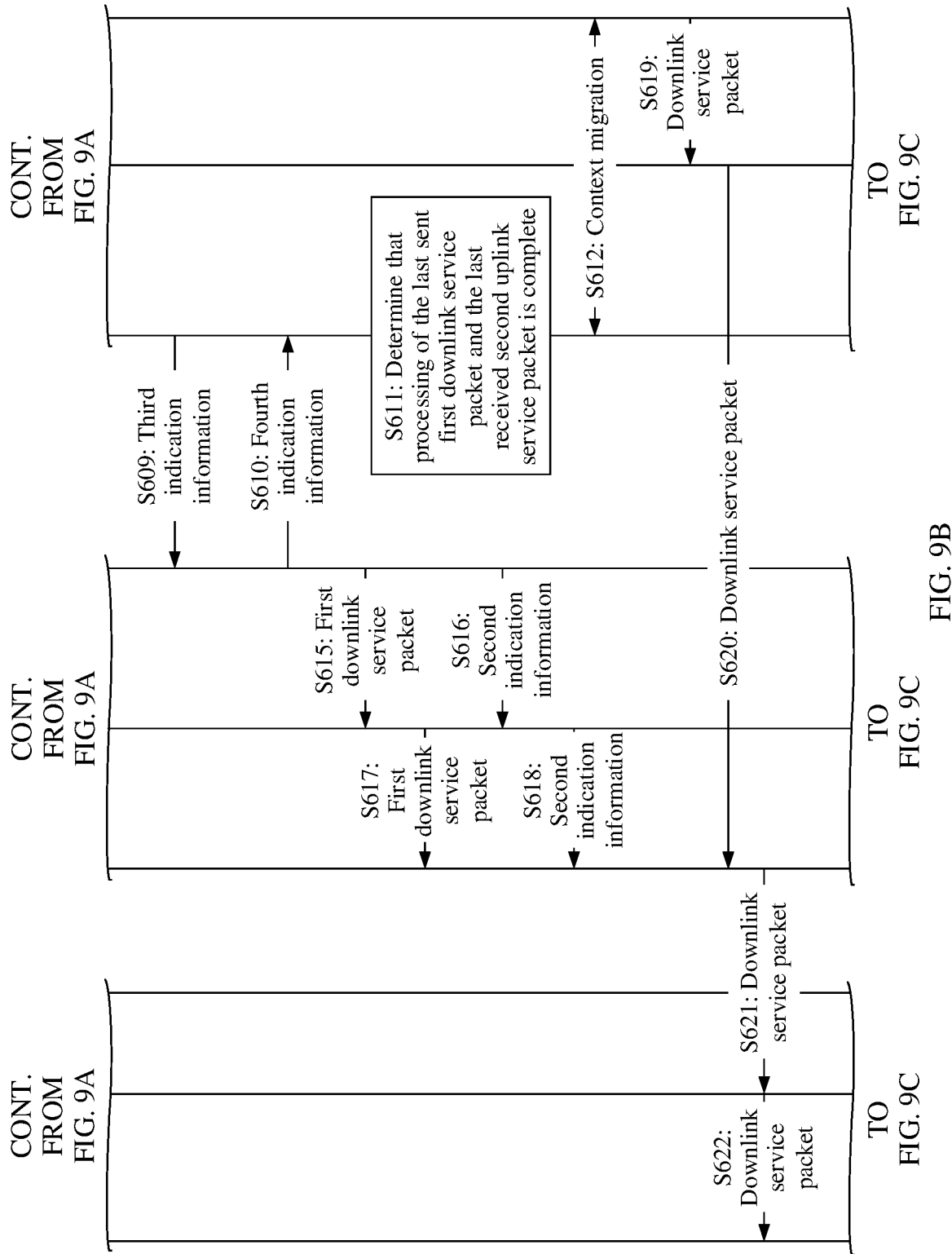
Figure 9C:
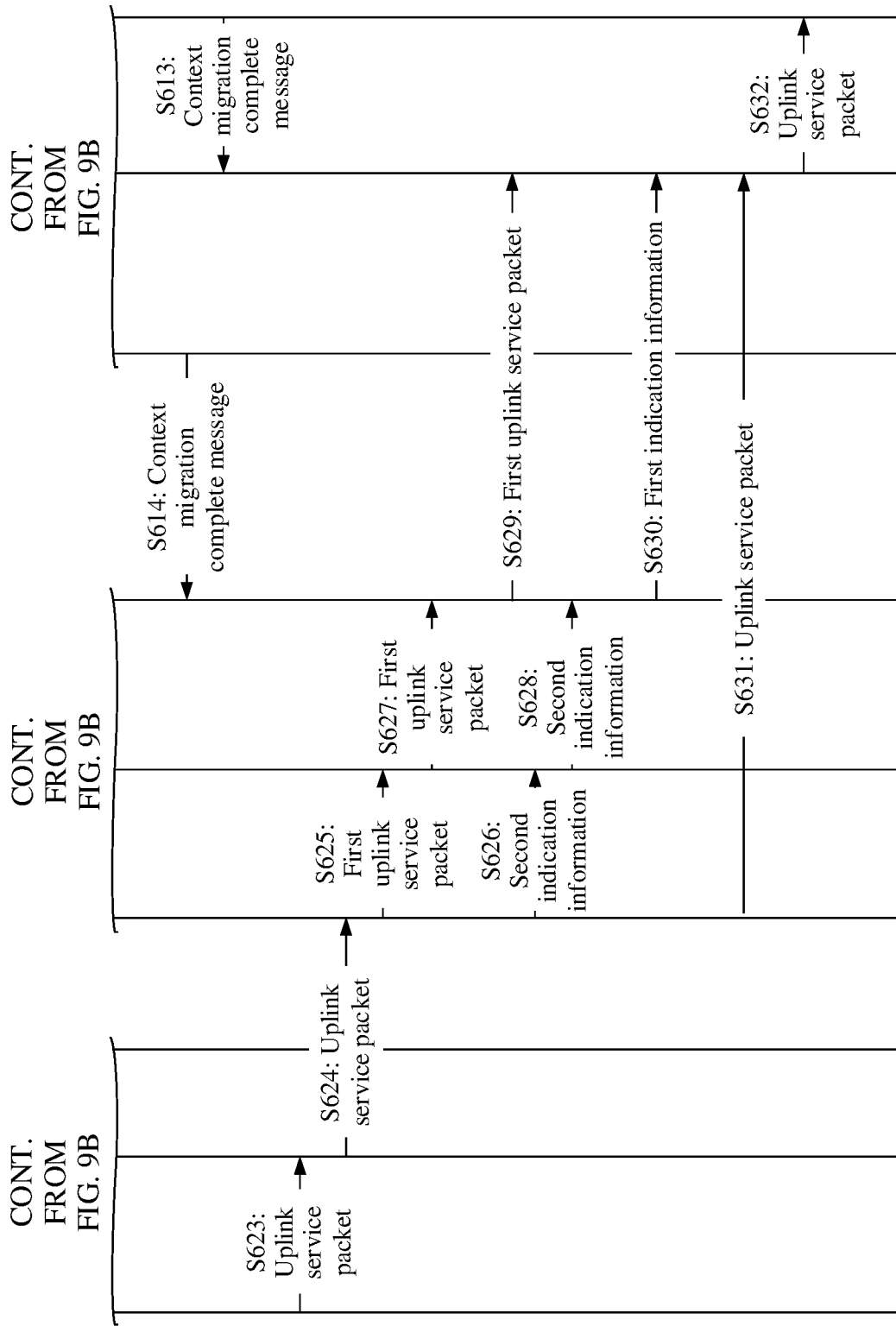

With reference to FIG. 9A, FIG. 9B, and FIG. 9C, the following describes a service packet transmission method 600 in the scenario in FIG. 3 according to an embodiment of this application. The method 600 includes the following steps.

S601: An SMF or a PCF determines that a DNAI needs to change after an anchor UPF of a terminal apparatus is handed over, and determines that context relocation or application relocation of the terminal apparatus needs to be performed, and the SMF or the PCF determines a target DNAI.

S602: The SMF or the PCF sends a second relocation request message to a source MEC, and the source MEC receives the second relocation request message sent by the SMF or the PCF, where the second relocation request message is used to trigger to relocate a context of the terminal apparatus, and the second relocation request message includes the target DNAI and an identifier of the terminal apparatus.

For example, the identifier of the terminal apparatus may be an identity (ID) of the terminal apparatus, an internet protocol (IP) address of the terminal apparatus, or a generic public subscription identifier (GPSI) of the terminal apparatus.

S603: After receiving the second relocation request message, the source MEC sends a third relocation request message to a target MEC, where the third relocation request message is used to request whether the target MEC accepts the relocation of the context of the terminal apparatus, and the third relocation request message includes the identifier of the terminal apparatus.

S604: If the target MEC can accept the relocation of the context of the terminal apparatus, the target MEC sends an acknowledgment message of the third relocation request message to the source MEC, where the acknowledgment message of the third relocation request message is used to indicate that the target MEC can accept the relocation of the context of the terminal apparatus.

S605: The target MEC sends a fourth relocation request message to a target AS, and the target AS receives the fourth relocation request message sent by the target MEC, where the fourth relocation request message is used to request whether the target AS can accept the relocation of the context of the terminal apparatus, or the fourth relocation request message is used to indicate the target AS to relocate the context of the terminal apparatus, and the fourth relocation request message includes the identifier of the terminal apparatus. Optionally, the fourth relocation request message further includes a source DNAI corresponding to a source AS.

S606: If the target AS accepts the relocation of the context of the terminal apparatus, the target AS sends an acknowledgment message of the fourth request message to the target MEC, where the acknowledgment message of the fourth relocation request message is used to indicate that the target AS can accept the relocation of the context of the terminal apparatus.

S607: After receiving the second relocation request message, the source MEC sends a fifth relocation request message to the source AS, where the fifth relocation request message is used to request the AS to relocate the context of the terminal apparatus, and the fifth relocation request message includes the identifier of the terminal apparatus and the target DNAI.

For example, the foregoing first message may be the fifth relocation request message herein.

Optionally, the method 600 further includes S608: After the source AS receives the fifth relocation request message, the source AS pre-freezes the context of the terminal apparatus, to prepare to relocate the context of the terminal apparatus.

It should be noted that S608 is performed after S602, and an order of S608 and S603 is not limited.

It should be noted that in this embodiment of this application, an example in which the source AS and the target AS need to relocate the context of the terminal apparatus is merely used for description. However, this embodiment of this application is not limited thereto. The source AS and the target AS may alternatively relocate an application instance of the terminal apparatus. In view of this, the second relocation request message, the third relocation request message, the fourth relocation request message, and the fifth relocation request message further include an identifier of an application or an identifier of the application instance. In this way, the source AS and the target AS can relocate the application instance of the terminal apparatus.

S609: The source AS sends fourth indication information to the source MEC, where the fourth indication information is used to indicate that a first downlink service packet is the last downlink service packet from the source AS, to be specific, after sending the first downlink service packet, the source AS no longer sends a downlink service packet to the source MEC. For example, the fourth indication information may be a sequence number of the first downlink service packet.

Optionally, before sending the fourth indication information to the source MEC, the source AS may send the first downlink service packet to the source MEC. Optionally, after sending the fourth indication information to the source MEC, the source AS sends the first downlink service packet to the source MEC. Optionally, the source AS simultaneously sends the fourth indication information and the first downlink service packet to the source MEC. For example, the fourth indication information may be included in a packet header of the first downlink service packet. Regardless of a sending order of the fourth indication information and the first downlink service packet, the source AS no longer sends a downlink service packet to a source UPF after sending the first downlink service packet to the source MEC.

Optionally, S609 is performed after S608.

S610: After receiving the fourth indication information, the source MEC sends fifth indication information to the source AS, where the fifth indication information is used to indicate that a second uplink service packet is the last uplink service packet sent by the source MEC to the source AS, to be specific, after sending the second uplink service packet to the source AS, the source MEC no longer sends an uplink service packet to the source AS. For example, the fifth indication information may be a sequence number of the second uplink service packet.

Optionally, in S609 and S610, a management network element of the source AS may send the fourth indication information to the source MEC. Optionally, the source MEC may send the fifth indication information to the management network element of the source AS, and then the management network element of the source AS forwards the fifth indication information to the source AS.

S611: The source AS determines, based on the fifth indication information, that the second uplink service packet is the last uplink service packet from the source UPF, and the source AS determines that processing of the first downlink service packet and the last received second uplink service packet is complete.

Specifically, after receiving the second uplink service packet and replying with an acknowledgment message of the second uplink service packet, the source AS may determine that the processing of the second uplink service packet is complete. After sending the first downlink service packet and receiving an acknowledgment message of the first downlink service packet, the source AS may determine that the processing of the first downlink service packet is complete. Alternatively, when receiving the second uplink service packet, the source AS may consider that the processing of the second uplink service packet is complete, and after sending the first downlink service packet, the source AS may consider that the processing of the first downlink service packet is complete.

S612: The source AS determines the target AS based on the target DNAI, and completes the relocation of the context of the terminal apparatus to the target AS.

S613: After the source AS and the target AS relocate the context of the terminal apparatus, the source AS sends a context relocation complete message to the source MEC.

S614: The target AS sends the relocation complete message to the target MEC.

It should be noted that an order of S613 and S614 is not limited.

S615: The first downlink service packet is the last downlink service packet from the source AS. After receiving the first downlink service packet sent by the source AS, the source MEC sends the first downlink service packet to the source UPF, and the source UPF receives the first downlink service packet sent by the source MEC.

S616: After receiving the fourth indication information, the source MEC sends third indication information to the source UPF, and the source UPF receives the third indication information sent by the source MEC, where the third indication information is used to indicate that the sending of the downlink service packet that is from the source AS ends. In other words, the third indication information may indicate that sending of a downlink service packet that is from an old path or an original path ends.

Optionally, S615 and S616 may be performed simultaneously. To be specific, the source MEC may simultaneously send the third indication information and the first downlink service packet to the source UPF. For example, the third indication information is encapsulated into the packet header of the first downlink service packet for sending. In this case, S615 and S616 are performed after S609. Optionally, S615 is performed before S616. To be specific, the source MEC may send the third indication information after sending the first downlink service packet. In this case, S616 is performed after S609, and an order of S615 and S609 is also not limited. In other words, after receiving the fourth indication information, the source MEC is triggered to send the third indication information to the source UPF. If the first downlink service packet and the third indication information are simultaneously sent, the first downlink service packet and the third indication information are sent after S609. If the first downlink service packet is sent before the third indication information, the third indication information is sent after S609, and an order of S615 and S609 is not limited.

It should be noted that an order of S616 and S610 to S614 is not limited, and S616 only needs to be performed after S609.

S617: The source UPF sends, to a target UPF, the first downlink service packet that is from the source MEC.

S618: The source UPF sends, to the target UPF, the third indication information that is from the source MEC.

It should be noted that, if the source MEC first sends the first downlink service packet and then sends a downlink packet carrying the third indication information in S615 and S616, the source UPF may also send the first downlink service packet and then send a downlink service packet carrying the third indication information, that is, S617 is first performed, and then S618 is performed. If the source MEC simultaneously sends the first downlink service packet and the third indication information to the source UPF in S615 and S616, in S617 and S618, the source UPF simultaneously sends, to the target UPF, the first downlink service packet and the third indication information that are received from the source MEC.

S619: After S612, and after the target AS establishes a link to the target MEC, the target AS may send a downlink service packet to the target MEC.

S620: The target MEC sends the downlink service packet in S619 to the target UPF.

S621: If the target UPF receives both the first downlink service packet from the source UPF in S617 and the downlink service packet that is from the target MEC in S619, and if the target UPF has a downlink service packet from the target MEC before receiving the third indication information, the target UPF buffers the downlink service packet that is from the target MEC. After receiving the third indication information, and after determining that the first downlink service packet is sent to an access network device, the target UPF sends, to the access network device, the downlink service packet that is from the target MEC. In this way, it can be ensured that the downlink service packet from the source AS is preferentially transmitted, and then the downlink service packet from the target AS is transmitted. This prevents downlink service packets from being out of order.

S622: The access network device sends the downlink service packet received in S621 to the terminal apparatus through an air interface.

S623: The terminal apparatus does not sense handover on a network side, and the terminal apparatus also sends an uplink service packet to the access network device when receiving the downlink service packet.

It should be noted that an order of S623 and any one of the foregoing steps is not limited. When the terminal apparatus needs to send the uplink service packet, S623 is performed, and no order limitation is imposed.

S624: The access network device sends, to the target UPF, the uplink service packet that is from the terminal apparatus.

Similarly, S624 only needs to be performed after S623, and an order of S624 and the foregoing other steps is not limited. When receiving the uplink service packet sent by the terminal apparatus, and the access network device needs to send the uplink service packet to the target UPF, S624 is performed, and no order limitation is imposed.

S625: After receiving the uplink service packet sent by the access network device, the target UPF sends a first uplink service packet to the source UPF, where the target UPF no longer sends an uplink service packet to the source UPF after receiving the third indication information.

S626: After receiving the third indication information, the target UPF sends second indication information to the source UPF, where the first indication information is used to indicate that the sending of the first uplink service packet by the source UPF ends, that is, the target UPF no longer sends the uplink service packet to the source UPF.

In an alternative manner of S626, after receiving the downlink service packet from the target MEC or receiving the context relocation complete message sent by the target MEC, the target UPF sends the second indication information to the source UPF. After S619, the target MEC may send the context relocation complete message to the target UPF.

In other words, the target UPF may send the second indication information to the source UPF in two cases. Case 1: After receiving the third indication information sent by the source UPF, the target UPF sends the second indication information to the source UPF. Case 2: After receiving the downlink service packet from the target MEC or receiving the context relocation complete message sent by the MEC, the target UPF sends the second indication information to the source UPF.

Optionally, the second indication information may be sent after the last first uplink service packet, to be specific, the target UPF first sends the first uplink service packet to the source UPF, and then sends an uplink service packet carrying the second indication information. The uplink service packet carrying the second indication information has a same data packet format as the first uplink service packet. For example, if the first uplink service packet is a GTP data packet and includes a GTP-U header, the uplink packet carrying the second indication information is also a GTP data packet, and the second indication information may be set in a specific flag bit of a GTP-U header. For example, the specific flag bit is set to "o" or "1". Except for the specific flag bit, the GTP-U header of the uplink packet carrying the second indication information is the same as that of the first uplink service packet. Optionally, the target UPF may alternatively encapsulate the second indication information into a packet header of the last first uplink service packet and send the first uplink service packet to the source UPF.

S627: When receiving the first uplink service packet from the target UPF, the source UPF forwards the first uplink service packet to the source MEC, and the source MEC receives the first uplink service packet from the source UPF.

S628: The source UPF further forwards, to the source MEC, first indication information that is from the target UPF, and the source MEC receives the first indication information from the source UPF.

S629: After sending the fifth indication information to the source AS, and when receiving the first uplink service packet from the source UPF, the source MEC forwards the first uplink service packet to the target MEC.

S630: After receiving the second indication information, the source MEC sends first indication information to the target MEC. In this way, the target MEC may determine, by using the first indication information, that sending of the uplink service packet that is from the source MEC ends. For related descriptions of the first indication information and the second indication information, refer to the descriptions in the method 200.

It should be noted that the source UPF sequentially sends the first uplink service packet and the second indication information to the source MEC, that is, the source UPF sends the first uplink service packet and the second indication information to the source MEC in an order of receiving the first uplink service packet and the second indication. The source MEC sequentially sends the first uplink service packet and the first indication information to the target MEC, where an order relationship between the second indication information and the first uplink service packet is the same as an order relationship between the first indication information and the uplink service packet. If the source MEC first receives the first uplink service packet sent by the source UPF and then receives the second indication information sent by the source UPF, the source MEC first sends the first uplink packet and then sends the first indication information to the target MEC. In other words, the source MEC sends the first uplink service packet and the first indication information to the target MEC in the order of receiving the first uplink service packet and the second indication.

S631: After sending the first uplink service packet and the second indication information to the source UPF, the target UPF no longer sends an uplink service packet to the source UPF. When receiving an uplink service packet from the access network device again, the target UPF needs to send the uplink service packet to the target MEC.

S632: After S613, it indicates that the target MEC establishes the link to the target AS, and the target MEC may send an uplink service packet to the target AS. Alternatively, after the target MEC receives the downlink service packet that is from the target AS, the target MEC determines that the link is established to the target AS, and the target MEC may send an uplink service packet to the target AS. Specifically, a sending process is that the first uplink service packet, namely, the uplink service packet from the source MEC in S629, is first sent, and then the uplink access packet directly from the target UPF in S631 is sent.

To be specific, in S632, before the target MEC determines that the uplink service packet can be sent to the target AS, the target MEC buffers the uplink service packet that is directly sent from the target UPF.

Optionally, in the method 600, before the source MEC interacts with the source AS, the source AS registers with the source MEC, where registration content includes an application identifier. Optionally, the registration content may further include an application instance identifier or traffic filtering information (traffic filtering information, such as a 5-tuple of a service). With the information, the source MEC can detect starting and ending of the service. Optionally, before the target MEC interacts with the target AS, the source AS registers with the source MEC, where registration content includes an application identifier. Optionally, the registration content may further include an application instance identifier or traffic filtering information. With the information, the target MEC can detect starting and ending of a service.

It should be noted that the first uplink service packet is an uplink service packet that has been sent to the source UPF or the source MEC but has not been forwarded to the source AS in a context relocation process of the terminal apparatus. A packet that has been sent to the source UPF or the source MEC may also be referred to as a packet on an old path or an original path. In this case, the packet on the old path or the original path needs to be forwarded to the target MEC, and forwarded to the target AS by using the target MEC, to avoid loss of the uplink service packet. In addition, the first indication information is used to indicate that sending of the packet on the old path or the original path ends. In this way, the target MEC ensures to send the uplink service packet from the target UPF after sending the uplink service packet on the old path or the original path. This can avoid an out-of-order problem of uplink service packets.

Figure 10C:
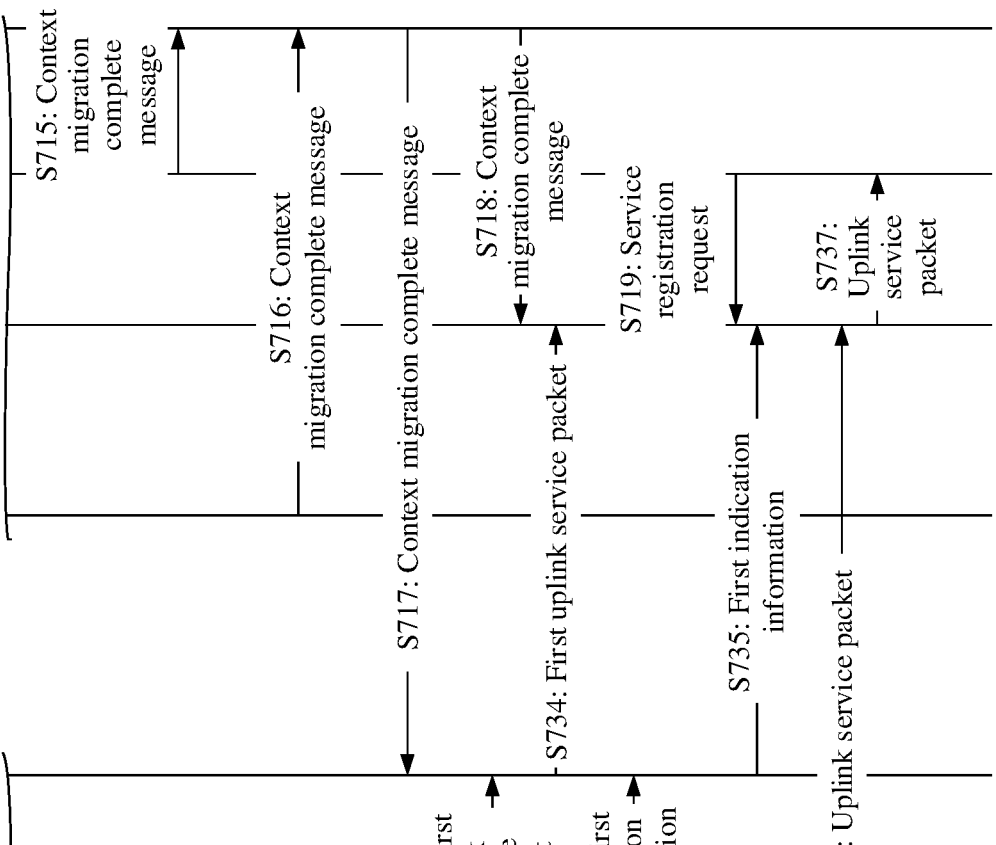
Figure 10C:
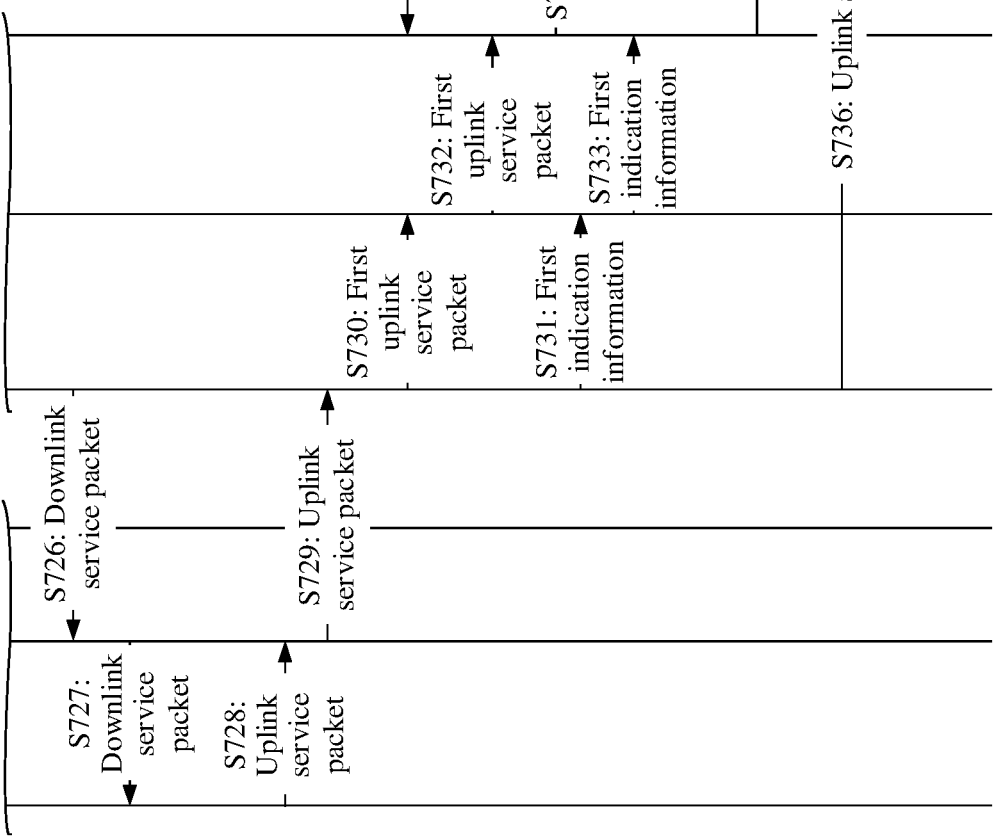

With reference to FIG. 10A, FIG. 10B, and FIG. 10C, the following describes a service packet transmission method 700 in the scenario in FIG. 4 according to an embodiment of this application. The method 700 includes the following steps.

S701: An SMF or a PCF determines that a DNAI needs to change after an anchor UPF of a terminal apparatus is handed over, and determines that first application instance relocation of the terminal apparatus needs to be performed, and the SMF or the PCF determines a target DNAI.

S702: The SMF or the PCF sends a second relocation request message to a source MEC, and the source MEC receives the second relocation request message sent by the SMF or the PCF, where the second relocation request message is used to trigger to relocate a context of a first application instance, and the second relocation request message includes the target DNAI and an identifier of the first application instance.

S703: After receiving the second relocation request message, the source MEC sends a third relocation request message to a target MEC, where the third relocation request message is used to request whether the target MEC accepts the relocation of the context of the first application instance, and the third relocation request message includes the identifier of the first application instance.

S704: If the target MEC can accept the relocation of the context of the terminal apparatus, the target MEC sends an acknowledgment message of the third relocation request message to the source MEC, where the acknowledgment message of the third relocation request is used to indicate that the target MEC can accept the relocation of the context of the first application instance.

S705: The source MEC sends a first relocation request message to an MEC application management network element, where the first relocation request message is used to request the MEC application management network element to relocate the context of the first application instance, and the first relocation request message includes the identifier of the first application instance and the target DNAI.

S706: The MEC application management network element sends an acknowledgment message of the first relocation request message to the source MEC, where the acknowledgment message is used to indicate that the MEC application management network element can accept the relocation of the context of the first application instance.

S707: The MEC application management network element sends a second trigger message to a source AS, where the second trigger message is used to trigger the source AS to relocate the first application instance.

S708: After determining a target AS corresponding to the target DNAI, the MEC application management network element creates a virtual resource of the first application instance on the target AS, so that the target AS relocates the first application instance based on the virtual resource. For example, the MEC application management network element may indicate the target AS to install a virtual machine, and relocate the first application instance by using the virtual machine.

S709: The MEC application management network element sends a first trigger message to the target AS, where the first trigger message includes the identifier of the first application instance.

It should be noted that an order of S707 and S709 is not limited, and S707 and S709 may be performed simultaneously or sequentially. This is not limited in this embodiment of this application.

Optionally, the method 700 further includes S710: After the source AS receives the second trigger message, the source AS pre-freezes the context of the first application instance, to prepare to relocate the context of the first application instance.

S711 to S714 are the same as S609 to S612.

S715: After the source AS and the target AS relocate the context of the first application instance, the target AS sends a context relocation complete message to the MEC application management network element.

S716: After the source AS and the target AS relocate the context of the first application instance, the source AS sends a context relocation complete message to the MEC application management network element.

It should be noted that an order of S714 and S715 is not limited, and S714 and S715 may be performed simultaneously or sequentially. This is not limited in this embodiment of this application.

S717: The MEC application management network element sends the context relocation complete message to the source MEC.

S718: The MEC application management network element sends the context relocation complete message to the target MEC.

S719: The target AS sends a service registration request to the target MEC, where the service registration request is used to request a service identifier, the service identifier is used to identify one application, and one application may correspond to a plurality of application instances. In this way, one service identifier may correspond to a plurality of application instance identifiers. Optionally, registration content may further include an application instance identifier or traffic filtering information (such as a 5-tuple of a service). With the information, the target MEC can detect starting and ending of the service.

It should be noted that S719 is performed after S715, and an order of S719, S717, and S718 is not limited.

S720 to S737 are the same as S615 to S632.

Figure 11:
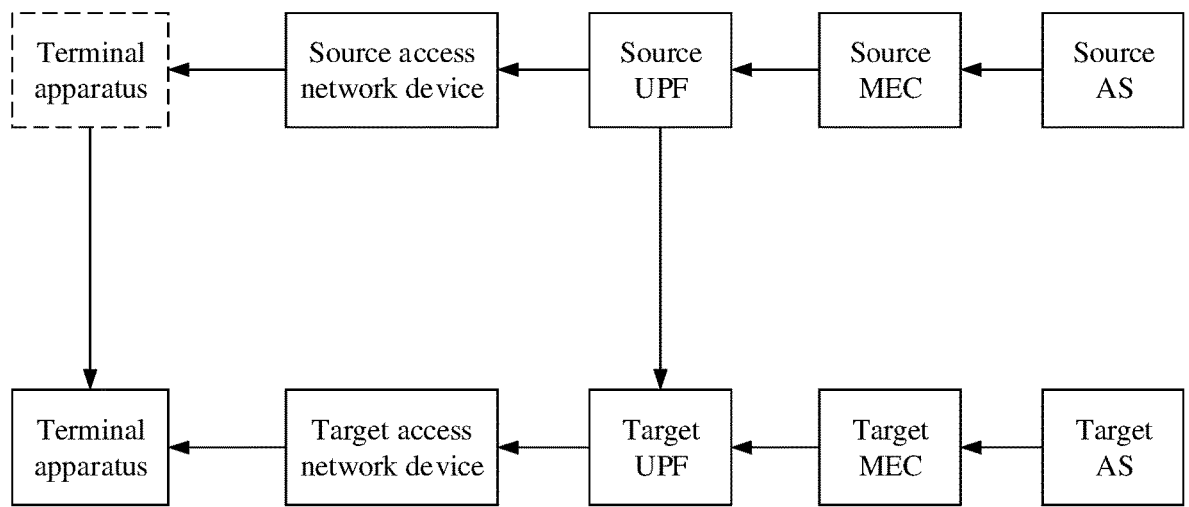
FIG. 11 is a schematic diagram of a downlink service packet transmission path according to an embodiment of this application.
Figure 12:
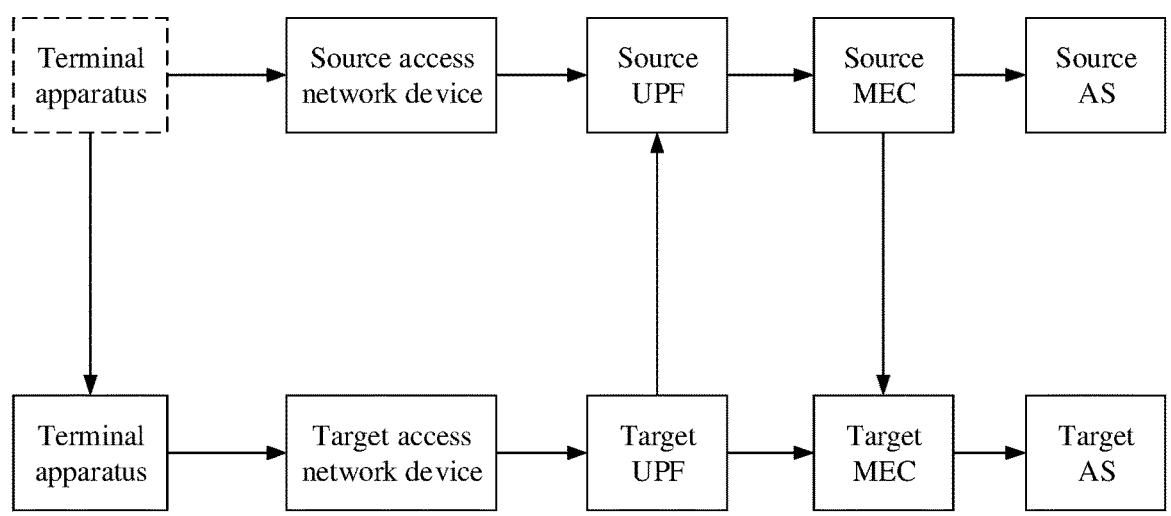
FIG. 12 is a schematic diagram of an uplink service packet transmission path according to an embodiment of this application.

The following briefly describes a downlink service packet and an uplink service packet in the embodiments of this application with reference to FIG. 11 and FIG. 12.

For a downlink service packet, as shown in FIG. 11, before a terminal apparatus moves, a transmission path of the downlink service packet is source AS-source MEC-source UPF-source access network device-terminal apparatus. When the terminal apparatus moves from coverage of the source access network device to coverage of a target access network device, the terminal apparatus is handed over to the target access network device through air interface handover. In this case, a transmission path of the downlink service packet is source AS-source MEC-source UPF-target UPF-target access network device-terminal apparatus, where the path is referred to as an old path or an original path. A transmission path of the service packet on the old path or the original path becomes longer, causing a relatively high latency of the packet on the old path or the original path. Therefore, the path of the downlink service packet needs to be switched to a new path, namely, target AS-target MEC-target UPF-target access network device-terminal apparatus. However, when the path of the downlink service packet is switched from the old path or the original path to the new path, downlink service packets on the old path are prone to be out of order. In this embodiment of this application, the target UPF may simultaneously receive downlink service packets from the old path and the new path. In other words, the target UPF may receive a downlink service packet sent by the source UPF and also receive a downlink service packet sent by the target MEC. For the downlink service packet on the old path, the source AS sends fourth indication information to the source MEC, to indicate that the last downlink service packet sent by the source AS to the source MEC is a first downlink service packet. After the source MEC receives the fourth indication information, and after the source MEC sends the first downlink service packet to the source UPF, the source MEC sends third indication information to the source UPF, and the source UPF forwards the third indication information to the target UPF, to indicate that sending of the downlink service packet that is from the source AS ends. Before receiving the third indication information, the target UPF sequentially sends, to the target access network device, downlink service packets that are from the old path, and buffers a packet that is from the new path until the target UPF receives the third indication information. In addition, it is ensured that the downlink service packet on the new path is sent after all the downlink service packets on the old path are sent. In this way, an out-of-order problem of downlink service packets can be avoided. In other words, it needs to be ensured that the target UPF sends the downlink service packet on the new path only after sending all the downlink service packets on the old path.

For an uplink service packet, as shown in FIG. 12, before a terminal apparatus moves, a transmission path of the uplink service packet is terminal apparatus-source access network device-source UPF-source MEC-source AS. When the terminal apparatus moves from coverage of the source access network device to coverage of a target access network device, the terminal apparatus is handed over to the target access network device through air interface handover. In this case, a transmission path of the uplink service packet is terminal apparatus-target access network device-target UPF-source UPF-source MEC-source AS, where the path is referred to as an old path or an original path. A transmission path of the service packet on the old path or the original path becomes longer, causing a relatively high latency of the packet on the old path or the original path. Therefore, the path of the uplink service packet needs to be switched to a new path: terminal apparatus-target access network device-target UPF-target MEC-target AS. However, when the path of the uplink service packet is switched from the old path or the original path to the new path, the uplink service packet on the old path is prone to be lost. In this embodiment of this application, in a path switching process, a transmission path of an uplink service packet that has been sent to the target UPF but has not reached the source AS may be target UPF-source UPF-source MEC-target MEC-target AS. Specifically, when the target UPF receives third indication information sent by the source UPF, it indicates that sending of the downlink service packet on the old path ends. When sending the last uplink service packet to the source UPF, the target UPF may simultaneously send first indication information to the source UPF, to indicate that the sending of the uplink service packet that is from the target UPF ends. When receiving an uplink service packet from the target access network device again, the target UPF directly sends the uplink service packet to the target MEC without sending the uplink service packet to the source UPF. The source UPF forwards, to the source MEC, both the uplink service packet and the first indication information that are received from the target UPF. After sending the last uplink service packet (a second uplink service packet) to the source AS, the source MEC sequentially returns a first uplink service packet and the first indication information that are after the second uplink service packet to the target MEC, that is, forwards the packet on the old path to the new path in the switching process. The target MEC may determine, based on the first indication information, that the sending of the uplink service packet on the old path ends. After ensuring that all service packets on the old path have been sequentially sent to the target AS, the target MEC sends a buffered uplink service packet that is from the target UPF (the new path). In this way, an out-of-order problem of uplink service packets can be avoided while loss of the uplink service packet is avoided. In other words, it needs to be ensured that the target MEC sends the uplink service packet on the new path only after sending all the uplink service packets on the old path.

It should be noted that in the embodiments of this application, an example in which the source AS and the target AS need to relocate the context of the terminal apparatus is used for description. For example, the method 600 includes the identifier of the terminal apparatus. However, the embodiments of this application are not limited thereto. The terminal apparatus may be running an application (APP). In this case, the source AS and the target AS need to relocate a context of the application of the terminal apparatus. The method 600 may include the identifier of the terminal apparatus and an identifier of the application. The terminal apparatus may be running a PDU session. In this case, the source AS and the target AS need to relocate a context of the PDU session of the terminal apparatus. For example, the method 600 includes the identifier of the terminal apparatus and an identifier of the PDU session. To avoid repeated description, details are not described in the embodiments of this application by using examples.

It should further be noted that, in the embodiments of this application, the first downlink service packet may be first sent and then the third indication information may be sent, or the first downlink service packet and the third indication information may be simultaneously sent. When the first downlink service packet and the third indication information are simultaneously sent, a specific bit in the packet header of the first downlink service packet may be set to a specific value. For example, the specific value is 1 or 0, to be specific, when the specific value is 0 or 1, it indicates that the first downlink service packet is the last downlink service packet from the source AS.

In the embodiments of this application, the first uplink service packet may be first sent and then the first indication information (or the second indication information) may be sent, or the first uplink service packet and the first indication information (or the second indication information) may be simultaneously sent. When the first uplink service packet and the first indication information (or the second indication information) are simultaneously sent, a specific bit in a packet header of the last service packet in first downlink service packets may be set to a specific value as the first indication information or the second indication information. For example, the specific value is 1 or 0, to be specific, when the specific value is 0 or 1, it indicates that sending of the first uplink service packet ends.

The foregoing describes in detail the service packet transmission method according to the embodiments of this application with reference to FIG. 1 to FIG. 12. The following describes in detail service packet transmission apparatuses according to the embodiments of this application with reference to FIG. 13 to FIG. 18.

Figure 13:
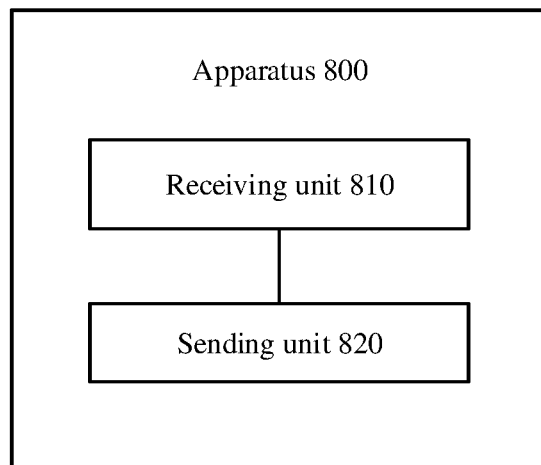
FIG. 13 is a schematic block diagram of another service packet transmission apparatus according to an embodiment of this application.

FIG. 13 is a schematic block diagram of a service packet transmission apparatus 800 according to an embodiment of this application. The apparatus 800 may correspond to the source MEC described in the foregoing method, or may correspond to a chip or a component of the source MEC. Each module or unit in the apparatus 800 may be configured to perform each action or processing process performed by the source MEC in the foregoing method. As shown in FIG. 13, the service packet transmission apparatus 800 may include a receiving unit 810 and a sending unit 820.

The receiving unit 810 is configured to after receiving a second uplink service packet, receive a first uplink service packet that is sent by a source user plane network element and that is from a target user plane network element, where the second uplink service packet is the last uplink service packet sent by the source mobile edge computing network element to a source application server.

The sending unit 820 is configured to send the first uplink service packet to a target MEC.

The sending unit 820 is configured to send first indication information to the target MEC, where the first indication information is used to indicate that the sending of the first uplink service packet by the apparatus 800 ends.

It should be noted that the receiving unit 810 and the sending unit 820 may be a same transceiver unit, or may be different transceiver units. This is not limited in this embodiment of this application.

In an optional embodiment, the receiving unit 810 is further configured to before the first uplink service packet is sent to the target MEC, receive the first uplink service packet that is sent by the source user plane function UPF and that is from the target UPF and the first indication information.

In an optional embodiment, the sending unit 820 is further configured to before sending the first uplink service packet to the target MEC, send a first downlink service packet and third indication information to the source UPF, where the third indication information is used to indicate that sending of a downlink service packet that is from the source AS ends.

In an optional embodiment, the receiving unit 810 is further configured to before the first downlink service packet is sent to the source UPF, receive fourth indication information sent by a first network element, where the fourth indication information is used to indicate that the last downlink service packet from the source AS is the first downlink service packet, and send fifth indication information to the first network element, where the fifth indication information is used to indicate that the second uplink service packet is the last uplink service packet sent by the apparatus to the source AS.

It should be understood that for a specific process in which each unit in the apparatus 800 performs the foregoing corresponding step, refer to the descriptions of the foregoing method embodiments with reference to FIG. 5 to FIG. 12. For brevity, details are not described herein again.

Figure 14:
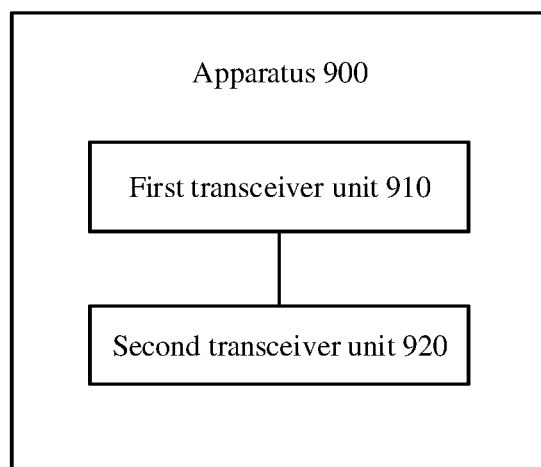
FIG. 14 is a schematic block diagram of still another service packet transmission apparatus according to an embodiment of this application.

FIG. 14 is a schematic block diagram of a service packet transmission apparatus 900 according to an embodiment of this application. The apparatus 900 may correspond to the target UPF described in the foregoing method, or may correspond to a chip or a component of the target UPF. Each module or unit in the apparatus 900 may be configured to perform each action or processing process performed by the target UPF in the foregoing method. As shown in FIG. 14, the service packet transmission apparatus 900 may include a first transceiver unit 910 and a second transceiver unit 920.

The first transceiver unit 910 is configured to send a first uplink service packet to a source UPF, where the apparatus no longer sends an uplink service packet to the source UPF after sending the first uplink service packet to the source UPF.

The second transceiver unit 920 is configured to send second indication information to the source UPF, where the second indication information is used to indicate that the sending of the first uplink service packet by the target user plane network element ends.

It should be noted that the first transceiver unit 910 and the second transceiver unit 920 may be a same transceiver unit, or may be different transceiver units. This is not limited in this embodiment of this application.

In an optional embodiment, the first transceiver unit 910 or the second transceiver unit 920 is further configured to before sending the first uplink service packet to the source UPF, receive a first downlink service packet and third indication information from the source UPF, where the third indication information is used to indicate that sending of a downlink service packet that is from a source application server AS ends.

In an optional embodiment, the second transceiver unit 920 is specifically configured to send first indication information to the source UPF based on the third indication information.

In an optional embodiment, the second transceiver unit 920 is specifically configured to after receiving a context relocation complete message sent by an SMF network element or a target MEC, send the first indication information to the source UPF.

In an optional embodiment, the first transceiver unit 910 or the second transceiver unit 920 is further configured to after sending the first indication information to the source UPF, send, to the target mobile edge computing MEC, an uplink service packet that is from an access network device.

In an optional embodiment, the first transceiver unit 910 or the second transceiver unit 920 is further configured to after receiving the third indication information, and after the first downlink service packet is sent, send, to an access network device, a downlink service packet that is from a target MEC.

It should be understood that for a specific process in which each unit in the apparatus 900 performs the foregoing corresponding step, refer to the descriptions of the foregoing method embodiments with reference to FIG. 5 to FIG. 12. For brevity, details are not described herein again.

Figure 15:
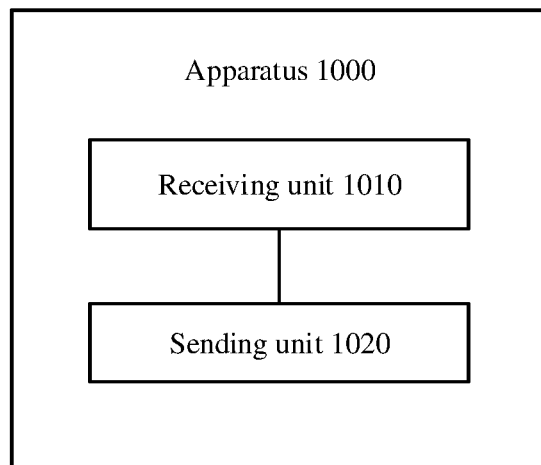
FIG. 15 is a schematic block diagram of still another service packet transmission apparatus according to an embodiment of this application.

FIG. 15 is a schematic block diagram of a service packet transmission apparatus 1000 according to an embodiment of this application. The apparatus 1000 may correspond to the target MEC described in the foregoing method, or may correspond to a chip or a component of the target MEC. Each module or unit in the apparatus 1000 may be configured to perform each action or processing process performed by the target MEC in the foregoing method. As shown in FIG. 15, the service packet transmission apparatus 1000 may include a receiving unit 1010 and a sending unit 1020.

The receiving unit 1010 is configured to receive a first uplink service packet from a source mobile edge computing MEC, where the first uplink service packet is an uplink service packet received by the source MEC after the source MEC receives a second uplink service packet, and the second uplink service packet is the last uplink service packet sent by the source MEC to a source application server AS.

The receiving unit 1010 is further configured to receive first indication information from the source MEC, where the first indication information is used to indicate that sending of the first uplink service packet by the source MEC ends.

The sending unit 1020 is configured to after the first indication information is received, send, to a target AS after the first uplink service packet is sent, an uplink service packet that is sent by a target user plane function UPF to the target MEC.

It should be understood that for a specific process in which each unit in the apparatus 1000 performs the foregoing corresponding step, refer to the descriptions of the foregoing method embodiments with reference to FIG. 5 to FIG. 12. For brevity, details are not described herein again.

Figure 16:
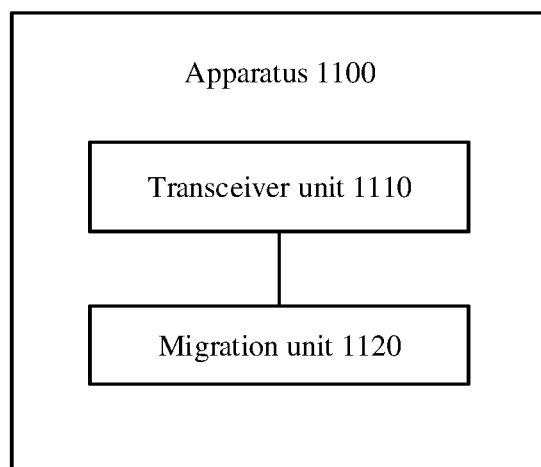
FIG. 16 is a schematic block diagram of still another service packet transmission apparatus according to an embodiment of this application.

FIG. 16 is a schematic block diagram of a service packet transmission apparatus 1100 according to an embodiment of this application. The apparatus 1100 may correspond to the source AS described in the foregoing method, or may correspond to a chip or a component of the source AS. Each module or unit in the apparatus 1100 may be configured to perform each action or processing process performed by the source AS in the foregoing method. As shown in FIG. 16, the service packet transmission apparatus 1100 may include a transceiver unit 1110 and a relocation unit 1120.

The transceiver unit 1110 is configured to receive a first message, where the first message is used to trigger relocation of a context of a terminal apparatus, and the first message includes a target data network access point identifier DNAI.

The relocation unit 1120 is configured to after it is determined that processing of a first downlink service packet and a second uplink service packet is complete, relocate the context of the terminal apparatus to a target application server AS corresponding to the target DNAI, where the first downlink service packet is the last downlink service packet sent by the apparatus to a source mobile edge computing MEC, and the second uplink service packet is the last uplink service packet sent by the source MEC to the apparatus.

In an optional embodiment, the transceiver unit 1110 is further configured to before relocating the context of the terminal apparatus to the target AS corresponding to the target DNAI, send fourth indication information to the source MEC, where the fourth indication information is used to indicate that the first downlink service packet is the last downlink service packet from the apparatus, and receive fifth indication information sent by the source MEC, where the fifth indication information is used to indicate that the second uplink service packet is the last uplink service packet sent by the source MEC to the apparatus.

It should be understood that for a specific process in which each unit in the apparatus 1100 performs the foregoing corresponding step, refer to the descriptions of the foregoing method embodiments with reference to FIG. 5 to FIG. 12. For brevity, details are not described herein again.

Figure 17:
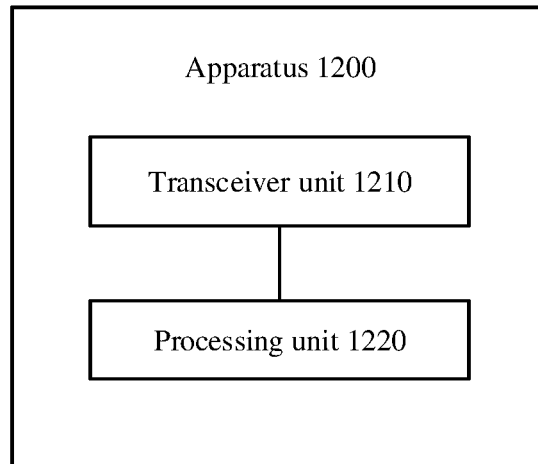
FIG. 17 is a schematic block diagram of still another service packet transmission apparatus according to an embodiment of this application.

FIG. 17 is a schematic block diagram of a service packet transmission apparatus 1200 according to an embodiment of this application. The apparatus 1200 may correspond to the MEC application management network element described in the foregoing method, or may correspond to a chip or a component of the MEC application management network element. Each module or unit in the apparatus 1200 may be configured to perform each action or processing process performed by the MEC application management network element in the foregoing method. As shown in FIG. 17, the service packet transmission apparatus 1200 may include a transceiver unit 1210 and a processing unit 1220.

The transceiver unit 1210 is configured to receive a first relocation request message sent by a source mobile edge computing MEC, where the first relocation request message includes an identifier of a first application instance and a target data network access point identifier DNAI.

The processing unit 1220 is configured to determine, based on the identifier of the first application instance, the first application instance that is to be relocated.

The transceiver unit 1210 is further configured to separately send a first trigger message and a second trigger message to a target AS corresponding to the target DNAI and a source AS corresponding to the first application instance, where the first trigger message includes the identifier of the first application instance, the first trigger message is used to trigger the target AS to relocate the first application instance, and the second trigger message is used to trigger the source AS to relocate the first application instance.

In an optional embodiment, the processing unit 1220 is further configured to before the first trigger message and the second trigger message are separately sent to the target AS corresponding to the DNAI and the source AS corresponding to the target application instance, create a virtual resource of the first application instance on the target AS, to enable the target AS to relocate the first application instance based on the virtual resource.

It should be understood that for a specific process in which each unit in the apparatus 1200 performs the foregoing corresponding step, refer to the descriptions of the foregoing method embodiments with reference to FIG. 5 to FIG. 12. For brevity, details are not described herein again.

The apparatus 800 in the foregoing solutions has a function of implementing corresponding steps performed by the source MEC in the foregoing methods. The apparatus 900 in the foregoing solutions has a function of implementing corresponding steps performed by the target UPF in the foregoing methods. The apparatus 1000 in the foregoing solutions has a function of implementing corresponding steps performed by the target MEC in the foregoing methods. The apparatus 1100 in the foregoing solutions has a function of implementing corresponding steps performed by the source AS in the foregoing methods. The apparatus 1200 in the foregoing solutions has a function of implementing corresponding steps performed by the MEC application management network element in the foregoing methods. The function may be implemented by hardware or software, or may be implemented by hardware executing corresponding software. The hardware or the software includes one or more modules corresponding to the foregoing functions. For example, a sending unit may be replaced with a communication interface, a receiving unit may be replaced with a communication interface, and another unit, for example, the determining unit, may be replaced with a processor, to separately perform a sending operation, a receiving operation, and a related processing operation in the method embodiments. In the embodiments of this application, a communication interface of an apparatus is used by the apparatus to communicate with another device. For example, the communication interface may be a transmitter, a receiver, a transceiver, a circuit, a bus, a module, a pin, or another type of communication interface. This is not limited in this embodiment of this application.

In a specific implementation process, the processor may be configured to perform, for example, but not limited to, baseband related processing, and the communication interface may be configured to perform, for example, but not limited to, information exchange. The foregoing components may be separately disposed on chips independent of each other, or at least some or all of the components may be disposed on a same chip. For example, the processor may further be classified into an analog baseband processor and a digital baseband processor. The analog baseband processor and the communication interface may be integrated on a same chip, and the digital baseband processor may be disposed on an independent chip. With continuous development of integrated circuit technologies, an increasing quantity of components may be integrated on a same chip. For example, the digital baseband processor and a plurality of application processors (for example, but not limited to a graphics processing unit and a multimedia processor) may be integrated on a same chip. The chip may be referred to as a system on chip (SOC). Whether to separately dispose the components on different chips or integrate the components on one or more chips depends on a specific product design requirement. Specific implementation forms of the foregoing components are not limited in the embodiments of this application.

Figure 18:
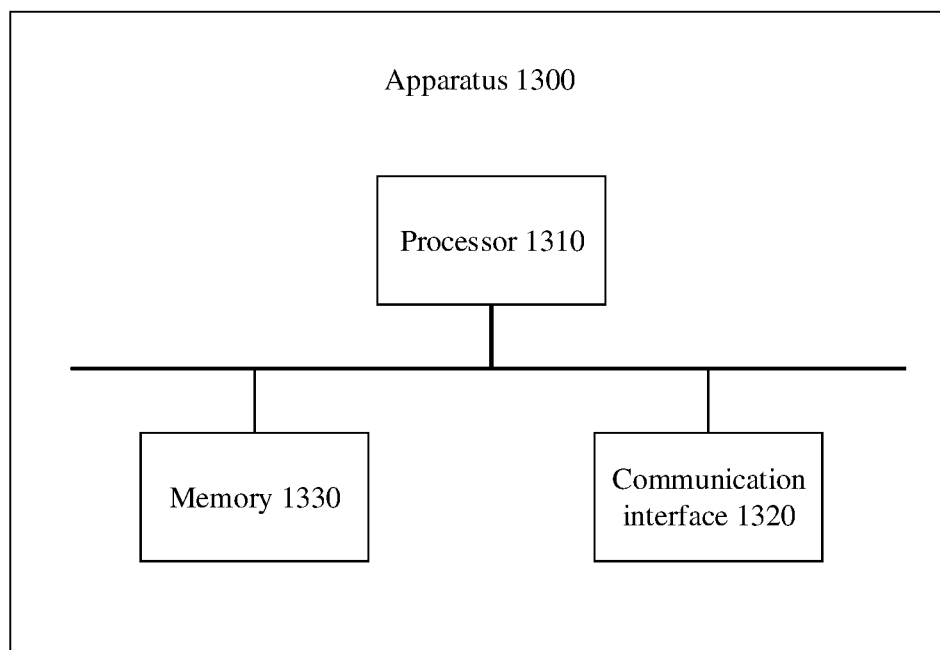
FIG. 18 is a schematic block diagram of still another service packet transmission apparatus according to an embodiment of this application.

It may be understood that the processor in the foregoing embodiments may execute program instructions by using a hardware platform having a processor and a communication interface, to separately implement a function of the processor in any design in the foregoing embodiments of this application. Based on this, as shown in FIG. 18, an embodiment of this application provides a schematic block diagram of a packet transmission apparatus 1300. The apparatus 1300 includes a processor 1310, a communication interface 1320, and a memory 1330. The processor 1310, the communication interface 1320, and the memory 1330 are coupled to communicate with each other. The memory 1330 is configured to store instructions. The processor 1310 is configured to execute the instructions stored in the memory 1330, to control the communication interface 1320 to send a signal and/or receive a signal. The coupling in this embodiment of this application is indirect coupling or a communication connection between apparatuses, units, or modules, may be in an electrical form, a mechanical form, or another form, and is used for exchange information between the apparatuses, the units, or the modules.

In a possible implementation, if the apparatus 1300 is a source MEC, the communication interface 1320 is configured to after receiving a second uplink service packet, receive a first uplink service packet that is sent by a source user plane network element and that is from a target user plane network element, where the second uplink service packet is the last uplink service packet sent by the source mobile edge computing network element to a source application server. The communication interface 1320 is further configured to send a first uplink service packet to a target mobile edge computing MEC. The communication interface 1320 is further configured to send first indication information to the target MEC, where the first indication information is used to indicate that the sending of the first uplink service packet by the apparatus 1300 ends.

In a possible implementation, if the apparatus 1300 is a target UPF, the communication interface 1320 is configured to send a first uplink service packet to a source user plane function UPF, where the apparatus 1300 no longer sends an uplink service packet to the source UPF after sending the first uplink service packet to the source UPF. The communication interface 1320 is further configured to send second indication information to the source UPF, where the second indication information is used to indicate that the sending of the first uplink service packet by the apparatus 1300 ends.

In a possible implementation, if the apparatus 1300 is a target MEC, the communication interface 1320 is configured to receive a first uplink service packet from a source mobile edge computing MEC, where the first uplink service packet is an uplink service packet received by the source MEC after the source MEC receives a second uplink service packet, where the second uplink service packet is the last uplink service packet sent by the source MEC to a source application server AS. The communication interface 1320 is further configured to receive first indication information from the source MEC, where the first indication information is used to indicate that sending of the first uplink service packet by the source MEC ends. The communication interface 1320 is further configured to after receiving the first indication information, send, to a target AS after the first uplink service packet is sent, an uplink service packet sent by a target user plane function UPF to the target mobile edge computing network element.

In a possible implementation, if the apparatus 1300 is a source AS, the communication interface 1320 is configured to receive a first message, where the first message is used to trigger relocation of a context of a terminal apparatus, and the first message includes a target data network access point identifier DNAI. The processor 1310 is configured to after determining that processing of a first downlink service packet and a second uplink service packet is complete, relocate the context of the terminal apparatus to a target application server AS corresponding to the target DNAI, where the first downlink service packet is the last downlink service packet sent by the apparatus to a source mobile edge computing MEC, and the second uplink service packet is the last uplink service packet sent by the source MEC to the apparatus.

In a possible implementation, if the apparatus 1300 is an MEC application management network element, the communication interface 1320 is configured to receive a first relocation request message sent by a source mobile edge computing MEC, where the first relocation request message includes an identifier of a first application instance and a target data network access point identifier DNAI. The processor 1310 is configured to determine, based on the identifier of the first application instance, the first application instance that is to be relocated. The communication interface 1320 is further configured to separately send a first trigger message and a second trigger message to a target AS corresponding to the target DNAI and a source AS corresponding to the first application instance, where the first trigger message includes the identifier of the first application instance, the first trigger message is used to trigger the target AS to relocate the first application instance, and the second trigger message is used to trigger the source AS to relocate the first application instance.

It should be understood that the apparatus in FIG. 13, the apparatus in FIG. 14, the apparatus in FIG. 15, the apparatus in FIG. 16, or the apparatus in FIG. 17 in the embodiments of this application may be implemented by using the apparatus 1300 in FIG. 18, and may be configured to perform steps and/or procedures corresponding to the target UPF network element, the source UPF network element, and the source AS in the foregoing method embodiments.

It may be understood that the methods, the procedures, the operations, or the steps in the designs described in the embodiments of this application can be implemented in a one-to-one correspondence manner by using computer software, electronic hardware, or a combination of computer software and electronic hardware. Whether the functions are performed by using hardware or software depends on specific applications and design constraints of the technical solutions. For example, in consideration of aspects such as good universality, low costs, and decoupling between software and hardware, the functions may be implemented by executing program instructions. For another example, in consideration of aspects such as system performance and reliability, the functions may be implemented by using a private circuit. A person of ordinary skill in the art may implement the described functions by using different methods for each particular application. This is not limited herein.

According to the method provided in the embodiments of this application, this application further provides a computer program product. The computer program product includes computer program code. When the computer program code is run on a computer, the computer is enabled to perform the method in the foregoing embodiments. The embodiments in this application may also be combined with each other.

According to the methods provided in the embodiments of this application, this application further provides a computer-readable medium. The computer-readable medium stores program code. When the program code is run on a computer, the computer is enabled to perform the methods in the foregoing embodiments.

In the embodiments of this application, it should be noted that the foregoing method embodiments in the embodiments of this application may be applied to a processor, or may be implemented by a processor. The processor may be an integrated circuit chip and has a signal processing capability. In an implementation process, steps in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in the embodiments of this application. The general-purpose processor may be a microprocessor, any conventional processor, or the like.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (erasable PROM, EPROM), an electrically erasable programmable read-only memory (electrically EPROM, EEPROM), or a flash memory. The volatile memory may be a random access memory (RAM) and is used as an external cache. There are a plurality of different types of RAMs, such as a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be understood that sequence numbers of the foregoing processes do not mean execution orders in various embodiments of this application. The execution orders of the processes should be determined based on functions and internal logic of the processes, and should not be construed as any limitation on the implementation processes of the embodiments of this application.

The terms "first", "second", and the like in this application are merely used to distinguish different objects, and "first" and "second" do not limit an actual order or functions of objects modified by "first" and "second". Any embodiment or design solution described as "example", "for example", "such as", "optionally", or "in some implementations" in this application should not be construed as being more preferred or having more advantageous than another embodiment or design. Specifically, using these words is intended to present a related concept in detail.

Names may be assigned to various objects that may appear in this application, for example, various messages/information/devices/network elements/systems/apparatuses/operations. It may be understood that these specific names do not constitute a limitation on the related objects, and the assigned names may change with a factor such as a scenario, a context, or a use habit. Understanding of technical meanings of technical terms in this application should be determined mainly based on functions and technical effects that are of the technical terms and that are reflected/performed in the technical solutions.

All or some of the foregoing embodiments may be implemented by using software, hardware, firmware, or any combination thereof. When software is used to implement the embodiments, all or some of the embodiments may be implemented in a form of a computer program product. The computer program product may include one or more computer instructions. When the computer program instructions are loaded and executed on a computer, all or some of the procedures or the functions according to the embodiments of this application are generated. The computer may be a general-purpose computer, a special-purpose computer, a computer network, a network device, a terminal apparatus, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic disk), an optical medium (for example, a DVD), a semiconductor medium (for example, a solid-state drive (solid-state drive, SSD)), or the like.

A person of ordinary skill in the art may be aware that units, algorithms, and steps in the examples described with reference to the embodiments disclosed in this application can be implemented by electronic hardware or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that for the purpose of convenient and brief description, for detailed working processes of the foregoing system, apparatus, and unit, refer to corresponding processes in the foregoing method embodiments. Details are not described herein again. In the embodiments of this application, on a premise that there is no logical contradiction, the embodiments may be mutually referenced. For example, methods and/or terms in the method embodiments may be mutually referenced, functions and/or terms in the apparatus embodiments may be mutually referenced, and functions and/or terms in the apparatus embodiments and the method embodiments may be mutually referenced.

In the several embodiments provided in this application, it should be understood that the disclosed system, apparatus, and method may be implemented in another manner. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, and may be located in one location, or may be distributed on a plurality of network units. Some or all of the units may be selected based on an actual requirement to achieve the objectives of the solutions in the embodiments.

In addition, functional units in the embodiments of this application may be integrated into one processing unit, or each of the units may exist alone physically, or two or more units may be integrated into one unit.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A service packet transmission method, comprising:
   receiving, by a target mobile edge computing network element, a first uplink service packet from a source mobile edge computing network element, wherein the first uplink service packet is an uplink service packet received by the source mobile edge computing network element after the source mobile edge computing network element receives a second uplink service packet, and wherein the second uplink service packet is the last uplink service packet sent by the source mobile edge computing network element to a source application server;
   receiving, by the target mobile edge computing network element, first indication information from the source mobile edge computing network element, wherein the first indication information indicates that sending of the first uplink service packet by the source mobile edge computing network element ends; and
   sending, by the target mobile edge computing network element, to a target application server, after the target mobile edge computing network element receives the first indication information, and after the first uplink service packet is sent, an uplink service packet that is sent by a target user plane network element to the target mobile edge computing network element.

2. The service packet transmission method according to claim 1, further comprising performing before the target mobile edge computing network element receives the first uplink service packet from the source mobile edge computing network element:
   receiving, by the target mobile edge computing network element, a third relocation request message from the source mobile edge computing network element, wherein the third relocation request message comprises an identifier of a terminal apparatus; and
   sending, by the target mobile edge computing network element, in response to the target mobile edge computing network element accepting relocation of a context of the terminal apparatus, an acknowledgment message of the third relocation request message to the source mobile edge computing network element, wherein the acknowledgment message of the third relocation request message indicates that the target mobile edge computing network element accepts the relocation of the context of the terminal apparatus.

3. The service packet transmission method according to claim 1, further comprising performing, before the target mobile edge computing network element receives the first uplink service packet from the source mobile edge computing network element:
   receiving, by the target mobile edge computing network element, a third relocation request message from the source mobile edge computing network element, wherein the third relocation request message comprises an identifier of a first application instance; and
   sending, by the target mobile edge computing network element, to the source mobile edge computing network element, in response to the target mobile edge computing network element accepting relocation of a context of a terminal apparatus, an acknowledgment message of the third relocation request message, wherein the acknowledgment message of the third relocation request message indicates that the target mobile edge computing network element accepts the relocation of the context of the terminal apparatus.

4. The service packet transmission method according to claim 1, wherein the uplink service packet is sent directly from the target user plane network element.

5. The service packet transmission method according to claim 1, wherein the target user plane network element is a user plane function (UPF) network element.

6. The service packet transmission method according to claim 1, wherein the first indication information is encapsulated in a packet header.

7. A service packet transmission method, comprising:
   receiving, by a source application server, a first message, wherein the first message is associated with triggering the source application server to relocate a context of a terminal apparatus, and wherein the first message comprises a target data network access point identifier; and
   relocating, by the source application server, to a target application server corresponding to the target data network access point identifier, after the source application server determines that processing of a first downlink service packet and a second uplink service packet is complete, the context of the terminal apparatus, wherein the first downlink service packet is the last downlink service packet sent by the source application server to a source mobile edge computing network element, and wherein the second uplink service packet is the last uplink service packet sent by the source mobile edge computing network element to the source application server.

8. The method according to claim 7, further comprising performing, before the relocating the context of the terminal apparatus:
sending, by the source application server, fourth indication information to the source mobile edge computing network element, wherein the fourth indication information indicates that the first downlink service packet is the last downlink service packet from the source application server; and
receiving, by the source application server, fifth indication information sent by the source mobile edge computing network element, wherein the fifth indication information indicates that the second uplink service packet is the last uplink service packet sent by the source mobile edge computing network element to the source application server.

9. The service packet transmission method according to claim 8, further comprising sending, by the source application server, after relocation of the context of the terminal apparatus, a context relocation complete message to the source mobile edge computing network element.

10. The service packet transmission method according to claim 8, further comprising sending, by the target application server, after relocation of the context of the terminal apparatus, a context relocation complete message to a target mobile edge computing network element.

11. The service packet transmission method according to claim 8, wherein the source application server determines that the processing of the first downlink service packet is complete in response to completing sending of the first downlink service packet.

12. The service packet transmission method according to claim 8, wherein the first message is sent to the source application server in response to the source application server sending an acknowledgement message that the target application server accepts relocation of the context of the terminal apparatus.

13. The service packet transmission method according to claim 8, further comprising pre-freezing, by the source application server, the context of the terminal apparatus after receiving the first message.

14. A source application server, comprising:
at least one processor; and
at least one memory storing instructions for execution by the at least one processor, the instructions including instructions to:
receive a first message, wherein the first message is associated with triggering the source application server to relocate a context of a terminal apparatus, and the first message comprises a target data network access point identifier; and
relocate, after the source application server determines that processing of a first downlink service packet and a second uplink service packet is complete, the context of the terminal apparatus to a target application server corresponding to the target data network access point identifier, wherein the first downlink service packet is the last downlink service packet sent by the source application server to a source mobile edge computing network element, and wherein the second uplink service packet is the last uplink service packet sent by the source mobile edge computing network element to the source application server.

15. The source application server according to claim 14, wherein the instructions further include instructions to:
send fourth indication information to the source mobile edge computing network element before the relocating the context of the terminal apparatus to the target application server corresponding to the target data network access point identifier, wherein the fourth indication information indicates that the first downlink service packet is the last downlink service packet from the source application server; and
receive fifth indication information from the source mobile edge computing network element, wherein the fifth indication information indicates that the second uplink service packet is the last uplink service packet from the source mobile edge computing network element to the source application server.

16. The source application server according to claim 14, wherein the instructions further include instructions to send, after relocation of the context of the terminal apparatus, a context relocation complete message to the source mobile edge computing network element.

17. The source application server according to claim 14, wherein the instructions further include instructions to send, after relocation of the context of the terminal apparatus, a context relocation complete message to a target mobile edge computing network element.

18. The source application server according to claim 14, wherein the processing of the first downlink service packet is complete in response to completing sending of the first downlink service packet.

19. The source application server according to claim 14, wherein the first message is sent to the source application server in response to the source application server sending an acknowledgement message that the target application server accepts relocation of the context of the terminal apparatus.

20. The source application server according to claim 14, wherein the instructions further include instructions to pre-freeze the context of the terminal apparatus after receiving the first message.

* * * * *